United States Patent
Chu et al.

(10) Patent No.: US 10,153,857 B1
(45) Date of Patent: Dec. 11, 2018

(54) ORTHOGONAL FREQUENCY DIVISION MULTIPLE ACCESS PROTECTION

(71) Applicant: Marvell International Ltd., Hamilton (BM)

(72) Inventors: Liwen Chu, San Ramon, CA (US); Lei Wang, San Diego, CA (US); Hongyuan Zhang, Fremont, CA (US); Hui-Ling Lou, Sunnyvale, CA (US); Jinjing Jiang, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 74 days.

(21) Appl. No.: 15/096,050

(22) Filed: Apr. 11, 2016

Related U.S. Application Data

(60) Provisional application No. 62/146,062, filed on Apr. 10, 2015.

(51) Int. Cl.
*H04J 11/00* (2006.01)
*H04W 72/04* (2009.01)
(Continued)

(52) U.S. Cl.
CPC ............ *H04J 11/00* (2013.01); *H04L 5/0055* (2013.01); *H04W 72/042* (2013.01);
(Continued)

(58) Field of Classification Search
CPC ............... H04J 11/00; H04W 72/0466; H04W 72/0413; H04W 72/042; H04W 84/12; H04L 5/0055

See application file for complete search history.

(56) References Cited

U.S. PATENT DOCUMENTS 7,599,332 B2  10/2009  Zelst et al.
7,742,390 B2   6/2010  Mujtaba
(Continued)

FOREIGN PATENT DOCUMENTS

WO    WO-2011/130344    10/2011

OTHER PUBLICATIONS

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

(Continued)

*Primary Examiner* — Alex Skripnikov
*Assistant Examiner* — Sharmin Chowdhury

(57) ABSTRACT

A method for simultaneous communication in a wireless local area network is described. A first control frame is transmitted by a first communication device to a plurality of communication devices, is duplicated across each of a plurality of sub-channels of an orthogonal frequency division multiplexing channel, and indicates that the communication devices are requested to simultaneously transmit respective control frames to the first communication device. Respective control frames are received, including second and third control frames from second and third communication devices, respectively, that are transmitted via a same sub-channel having a smallest bandwidth of the wireless local area network and indicate that at least some of the plurality of sub-channels are available. One of an orthogonal frequency division multiple access data unit and a duplicated legacy data unit is transmitted by the first communication device in response to the control frames via the available sub-channels.

24 Claims, 25 Drawing Sheets

(51) Int. Cl.
*H04L 5/00* (2006.01)
*H04W 84/12* (2009.01)

(52) U.S. Cl.
CPC ... *H04W 72/0413* (2013.01); *H04W 72/0466* (2013.01); *H04W 84/12* (2013.01)

(56) References Cited

U.S. PATENT DOCUMENTS

| | | | |
|---|---|---|---|
| 8,144,647 | B2 | 3/2012 | Nabar et al. |
| 8,149,811 | B2 | 4/2012 | Nabar et al. |
| 8,270,909 | B2 | 9/2012 | Zhang et al. |
| 8,363,578 | B1 | 1/2013 | Ramamurthy et al. |
| 8,395,997 | B2 | 3/2013 | Banerjea et al. |
| 8,472,383 | B1 | 6/2013 | Banerjea et al. |
| 8,599,803 | B1 | 12/2013 | Zhang et al. |
| 8,619,907 | B2 | 12/2013 | Mujtaba et al. |
| 8,660,497 | B1 | 2/2014 | Zhang et al. |
| 8,670,399 | B2 | 3/2014 | Liu et al. |
| 8,737,405 | B2 | 5/2014 | Liu et al. |
| 8,787,338 | B2 | 7/2014 | Liu et al. |
| 8,787,385 | B2 | 7/2014 | Liu et al. |
| 8,811,203 | B1 | 8/2014 | Liu et al. |
| 8,886,755 | B1 | 11/2014 | Liu et al. |
| 8,923,118 | B1 | 12/2014 | Liu et al. |
| 8,971,350 | B1 | 3/2015 | Liu |
| 9,215,055 | B2 | 12/2015 | Chu et al. |
| 2007/0060149 | A1 | 3/2007 | Lim et al. |
| 2007/0177541 | A1 | 8/2007 | Kwon et al. |
| 2007/0206534 | A1 | 9/2007 | Kwun et al. |
| 2008/0075058 | A1 | 3/2008 | Mundarath et al. |
| 2008/0084941 | A1 | 4/2008 | Mohanty et al. |
| 2008/0192644 | A1 | 8/2008 | Utsunomiya et al. |
| 2008/0292015 | A1 | 11/2008 | Lee |
| 2009/0196163 | A1 | 8/2009 | Du |
| 2010/0046358 | A1 | 2/2010 | van Nee |
| 2010/0067589 | A1 | 3/2010 | Schumacher et al. |
| 2010/0091675 | A1 | 4/2010 | Sawai |
| 2010/0118829 | A1 | 5/2010 | Lin et al. |
| 2010/0309834 | A1 | 12/2010 | Fischer et al. |
| 2011/0002219 | A1 | 1/2011 | Kim et al. |
| 2011/0038332 | A1 | 2/2011 | Liu et al. |
| 2011/0096796 | A1 | 4/2011 | Zhang et al. |
| 2011/0096797 | A1 | 4/2011 | Zhang et al. |
| 2011/0128929 | A1 | 6/2011 | Liu et al. |
| 2011/0128947 | A1 | 6/2011 | Liu et al. |
| 2011/0310827 | A1 | 12/2011 | Srinivasa et al. |
| 2012/0082040 | A1 | 4/2012 | Gong et al. |
| 2012/0263117 | A1* | 10/2012 | Love .......... H04L 5/003 370/329 |
| 2013/0229996 | A1 | 9/2013 | Wang et al. |
| 2013/0286959 | A1 | 10/2013 | Lou et al. |
| 2014/0133394 | A1* | 5/2014 | Abraham ........... H04W 48/14 370/328 |
| 2014/0307612 | A1* | 10/2014 | Vermani ........... H04L 5/0044 370/312 |
| 2015/0131517 | A1 | 5/2015 | Chu et al. |
| 2015/0146653 | A1 | 5/2015 | Zhang et al. |
| 2015/0146654 | A1 | 5/2015 | Chu et al. |
| 2015/0146807 | A1 | 5/2015 | Zhang et al. |
| 2016/0050659 | A1* | 2/2016 | Seok .......... H04L 1/0003 370/338 |
| 2016/0227578 | A1* | 8/2016 | Lee .......... H04W 74/004 |

OTHER PUBLICATIONS

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-456 (Sep. 2013).

IEEE Std 802.11ah™/D1.0 "Draft Standard for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," *The Institute of Electrical and Electronics Engineers, Inc.*, pp. 1-394 (Oct. 2013).

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).

IEEE Std 802.16™-2012 (Revision of IEEE Std. 802.16-2009), IEEE Standard for Air Interface for Broadband Wireless Access Systems: Part 1—Beginning through Section 7, IEEE Computer Society and the IEEE Microwave Theory and Techniques Society, *The Institute of Electrical and Electronics Engineers, Inc.*, 2558 pages (Aug. 17, 2012).

Bejarano et al., "IEEE 802.11ac: From Channelization to Multi-User MIMO," IEEE Communications Magazine, IEEE Service Center, vol. 51, No. 10, pp. 84-90 (Oct. 1, 2013).

Cariou et al., "Multi-channel Transmissions," Doc. No. IEEE 802.11-09/1022r0, The Institute of Electrical and Electronics Engineers, Inc., pp. 1-13 (Sep. 2009).

Chen, "Home Network Basis: Transmission Environments and Wired/Wireless Protocols," Prentice Hall, pp. 1-26 (Jul. 2006).

Hart, et al., "DL-OFDMA for Mixed Clients," IEEE 802.11-10/0317r1, 24 pages (Mar. 6, 2010).

Hiertz et al., "The IEEE 802.11 Universe," IEEE Communications Magazine, pp. 62-70, (Jan. 2010).

Liu, et al., "VHT BSS Channel Selection," Institute of Electrical and Electronics Engineers, Inc., doc. No. IEEE 802.11-11/1433r0, pp. 1-10 (Nov. 2011).

Noh, et al., "Channel Selection and Management for 11ac," Doc. No. IEEE 802.11-10/0593r1, *The Institute of Electrical and Electronics Engineers, Inc.*, pp. 1-21 (May 20, 2010).

Park, "IEEE 802.11ac: Dynamic Bandwidth Channel Access," 2011 IEEE Int'l Conf. on Communications (ICC), pp. 1-5 (Jun. 2011).

Pedersen et al., "Carrier Aggregation for LTE-Advanced: Functionality and Performance Aspects," IEEE Communications Magazine, vol. 49, No. 6, pp. 89-95, (Jun. 1, 2011).

Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).

Redieteab, et al., "Cross-Layer Multichannel Aggregation for Future WLAN Systems," 2010 IEEE Int'l Conf. on Communication Systems (ICCS), pp. 740-756 (Nov. 2010).

Seok et al., "HEW PPDU Format for Supporting MIMO-OFDMA," IEEE 802.11-14/1210r0, 16 pages, (Sep. 14, 2014).

Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).

Wannstrom, "Carrier Aggregation explained," pp. 1-6 (May 2012).

Yuan et al., "Carrier Aggregation for LTE-Advanced Mobile Communication Systems," IEEE Communications Magazine, pp. 88-93 (Feb. 2010).

U.S. Appl. No. 14/961,512, Chu et al., "Orthogonal Frequency Division Multiple Access Short Frame Format," filed Dec. 7, 2015.

* cited by examiner

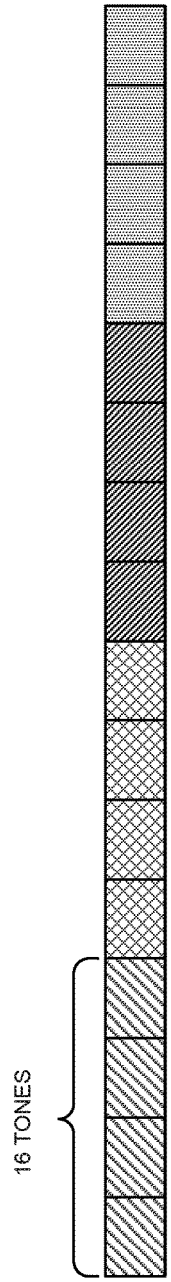
*FIG. 3A*
*FIG. 3B*
*FIG. 3C*
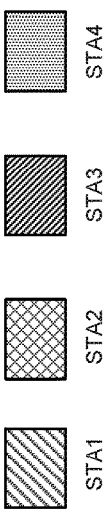

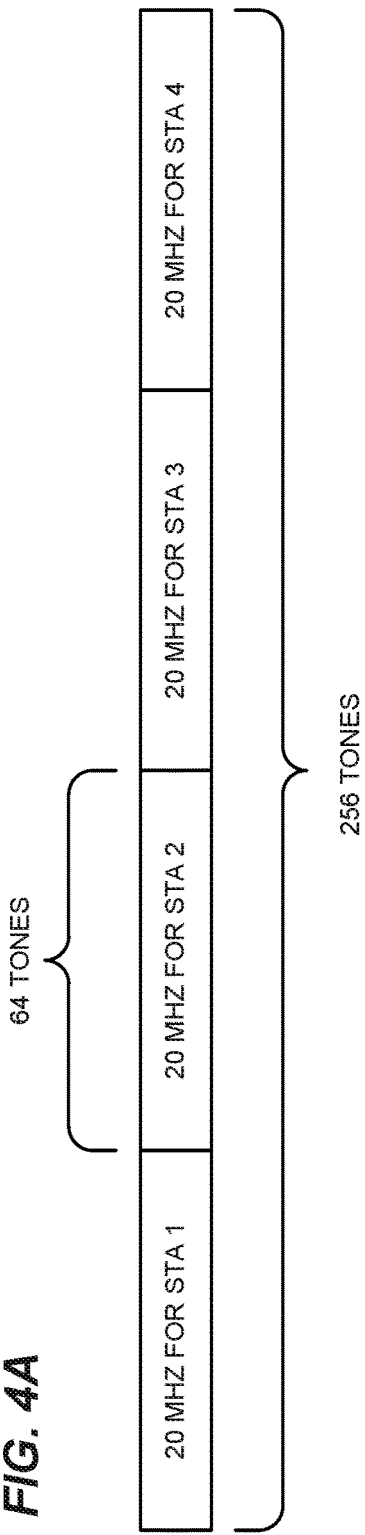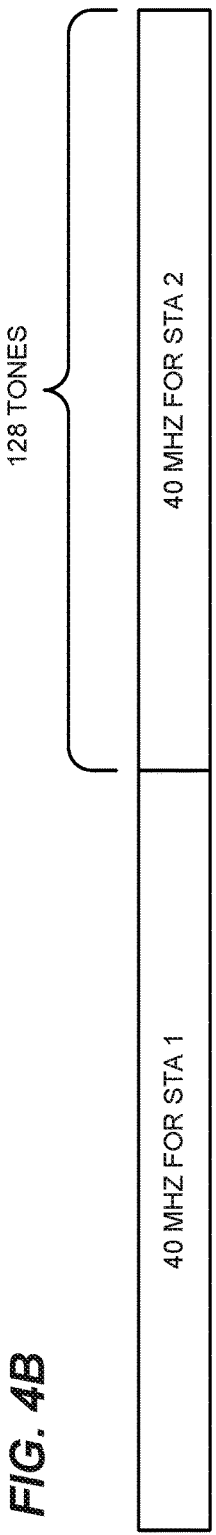
FIG. 4A
FIG. 4B

FIG. 4C

| 20 MHZ FOR STA 1 | 40 MHZ FOR STA 2 | 20 MHZ FOR STA 3 |

FIG. 4D

| 20 MHZ FOR STA 1 | 40 MHZ FOR STA 2 | 10 MHZ FOR STA 3 | 10 MHZ FOR STA 3 |

32 TONES

ORTHOGONAL FREQUENCY DIVISION MULTIPLE ACCESS PROTECTION

CROSS-REFERENCES TO RELATED APPLICATIONS

This application claims the benefit of U.S. Provisional Patent Application No. 62/146,062, entitled "OFDMA Protection with Simultaneous CTS," filed on Apr. 10, 2015, the disclosure of which is incorporated herein by reference in its entirety.

FIELD OF THE DISCLOSURE

The present disclosure relates generally to communication networks and, more particularly, to wireless local area networks that utilize orthogonal frequency division multiplexing (OFDM).

BACKGROUND

Wireless local area networks (WLANs) have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method for simultaneous communication in a wireless local area network includes transmitting, by a first communication device, a first control frame to a plurality of communication devices. The first control frame: i) is duplicated by the first communication device across each of a plurality of sub-channels of an orthogonal frequency division multiplexing (OFDM) channel, and ii) indicates that the plurality of communication devices are requested to simultaneously transmit respective control frames to the first communication device. The method includes receiving, at the first communication device, at least some of the respective control frames from at least some of the plurality of communication devices that include at least a second control frame from a second communication device of the plurality of communication devices, and a third control frame from a third communication device of the plurality of communication devices. The second control frame and the third control frame are transmitted by the second communication device and the third communication device, respectively, to the first communication device via a same sub-channel of the plurality of sub-channels having a smallest bandwidth of the wireless local area network. The at least some of the respective control frames indicate that at least some of the plurality of sub-channels are available. The method includes transmitting, by the first communication device, one of an orthogonal frequency division multiple access (OFDMA) data unit and duplicated legacy data unit in response to the at least some of the respective control frames via the at least some of the plurality of sub-channels that are available.

In another embodiment, a first communication device for simultaneous communication in a wireless local area network comprises a network interface device having one or more integrated circuits. The one or more integrated circuits are configured to transmit a first control frame to a plurality of communication devices. The first control frame: i) is duplicated by the first communication device across each of a plurality of sub-channels of an orthogonal frequency division multiplexing (OFDM) channel, and ii) indicates that the plurality of communication devices are requested to simultaneously transmit respective control frames to the first communication device. The one or more integrated circuits are configured to receive at least some of the respective control frames from at least some of the plurality of communication devices that include at least a second control frame from a second communication device of the plurality of communication devices, and a third control frame from a third communication device of the plurality of communication devices. The second control frame and the third control frame are transmitted by the second communication device and the third communication device, respectively, to the first communication device via a same sub-channel of the plurality of sub-channels having a smallest bandwidth of the wireless local area network, wherein the at least some of the respective control frames indicate that at least some of the plurality of sub-channels are available. The one or more integrated circuits are configured to transmit one of an orthogonal frequency division multiple access (OFDMA) data unit and duplicated legacy data unit in response to the at least some of the respective control frames via the at least some of the plurality of sub-channels that are available.

In an embodiment, a method for simultaneous communication in a wireless local area network includes receiving, by a first communication device and from a second communication device, a first control frame. The first control frame: i) is duplicated across each of a plurality of sub-channels of an orthogonal frequency division multiplexing (OFDM) channel, and ii) indicates a request for the first communication device to transmit a second control frame to the second communication device. The method includes determining, by the first communication device, whether at least some of the sub-channels of the plurality of sub-channels are available. The method includes, in response to determining that at least some of the plurality of sub-channels are available, providing the second control frame to the second communication device. The second control frame is duplicated across the at least some of the plurality of sub-channels that are available. Providing the second control frame includes generating the second control frame to indicate that the at least some of the plurality of sub-channels are available, identifying a scramble seed for the second control frame that allows the second communication device to decode i) the second control frame, and ii) a third control frame to be transmitted by a third communication device, where the second control frame is to be transmitted simultaneously with the third control frame, and scrambling the second control frame with the identified scramble seed.

In another embodiment, a first communication device for simultaneous communication in a wireless local area network includes a network interface device having one or more integrated circuits. The one or more integrated circuits are configured to receive, from a second communication device, a first control frame. The first control frame: i) is duplicated across each of a plurality of sub-channels of an orthogonal frequency division multiplexing (OFDM) channel, and ii) indicates a request for the first communication device to transmit a second control frame to the second communication device. The one or more integrated circuits are configured to determine whether at least some of the sub-channels of the plurality of sub-channels are available. The one or more integrated circuits are configured to, in response to determining that at least some of the plurality of sub-channels are available, provide the second control frame to the second communication device. The second control frame is duplicated across the at least some of the plurality of sub-channels that are available. The one or more integrated circuits are configured to generate the second control frame to indicate that the at least some of the plurality of sub-channels are available, identify a scramble seed for the second control frame that allows the second communication device to decode i) the second control frame, and ii) a third control frame to be transmitted by a third communication device, where the second control frame is to be transmitted simultaneously with the third control frame, and scramble the second control frame with the identified scramble seed.

BRIEF DESCRIPTION OF THE DRAWINGS

FIGS. 3A-3C are diagrams of example channel allocation schemes, according to various embodiments.

FIGS. 4A-4D are diagrams illustrating example OFDM sub-channel blocks for a communication channel, according to an embodiment.

DETAILED DESCRIPTION

Figure 1:
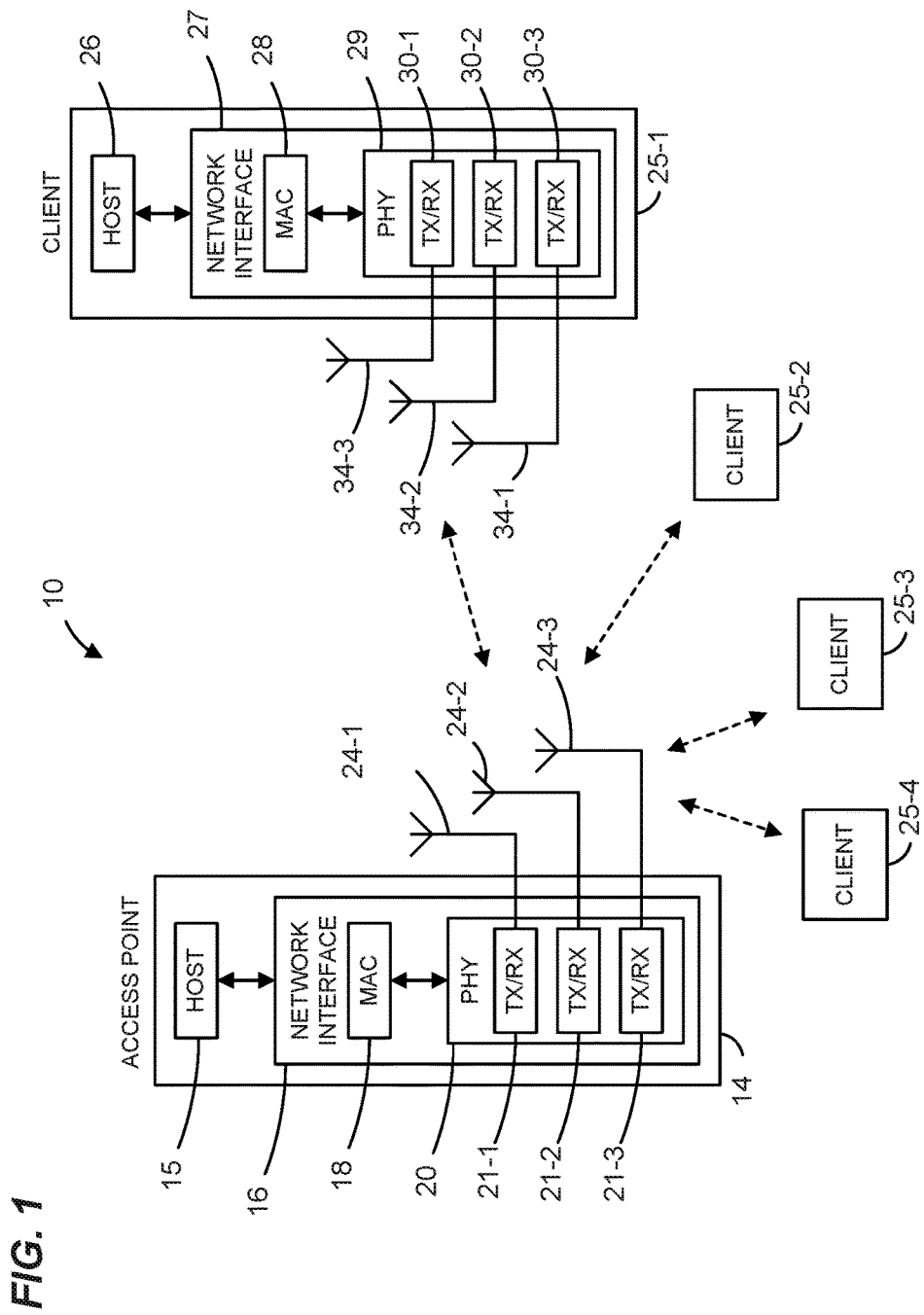
FIG. 1 is a block diagram of an example wireless local area network (WLAN), according to an embodiment.

In embodiments described below, a wireless network device such as an access point (AP) of a wireless local area network (WLAN) simultaneously transmits independent data streams to multiple client stations and/or receives independent data streams simultaneously transmitted by multiple client stations. In some embodiments, the AP transmits data for the multiple client stations in different orthogonal frequency division multiplexing (OFDM) sub-channels of an orthogonal frequency division multiple access (OFDMA) transmission. In some embodiments, the AP transmits data for the multiple client stations in different multi-user, multiple-input multiple output (MU-MIMO) streams. Similarly, multiple client stations simultaneously transmit data to the AP, for example, each client station transmits data in a different OFDM sub-channel of an OFDMA transmission or different MU-MIMO stream, in various embodiments.

The AP is configured to operate with client stations according to at least a first communication protocol. The first communication protocol is sometimes referred to herein as "high efficiency WiFi," "high efficiency WLAN," "HEW" communication protocol, or 802.11ax communication protocol. The first communication protocol supports OFDMA communication between the AP and the client stations. In some embodiments, different client stations in the vicinity of the AP (e.g., in the communication range of the AP) are configured to operate according to one or more other communication protocols that define operation in the same frequency band as the HEW communication protocol but with generally lower data throughputs. The lower data throughput communication protocols (e.g., IEEE 802.11a, IEEE 802.11n, and/or IEEE 802.11ac) are collectively referred herein as "legacy" communication protocols. The legacy communication protocols do not support OFDMA communication, in an embodiment. In an embodiment, client stations that are configured to operate according to the HEW communication protocol generally support OFDMA communication initiated by the AP. In some embodiments, client stations that are configured to operate according to the HEW communication protocol optionally support OFDMA communication initiated by the client stations.

In some embodiments and/or scenarios, the AP and client stations provide increased protection to data units (e.g., OFDMA data units or MU-MIMO data units) from interference by requesting a first control frame by the AP or transmitting a second control frame by the client station prior to the transmission of the data units. In an embodiment, the first control frame is a request to send (RTS) frame that allows communication devices near the AP to avoid interfering with uplink data units, for example, by setting a network allocation vector (NAV) based on the RTS frame. In an embodiment, the second control frame is a clear to send (CTS) frame that allows communication devices near the client stations to avoid interfering with downlink data units, for example, by setting the NAV based on the CTS frame.

FIG. 1 is a block diagram of an example wireless local area network (WLAN) 10, according to an embodiment. An AP 14 includes a host processor 15 coupled to a network interface 16. In an embodiment, the network interface 16 includes one or more integrate circuits (ICs) configured to operate as discussed below. The network interface 16 includes a medium access control (MAC) processor 18 and a physical layer (PHY) processor 20. The PHY processor 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In some embodiments, the AP 14 includes a higher number of antennas 24 than transceivers 21, and antenna switching techniques are utilized. In an embodiment, the MAC processor 18 is implemented on at least a first IC, and the PHY processor 20 is implemented on at least a second IC. In an embodiment, at least a portion of the MAC processor 18 and at least a portion of the PHY processor 20 are implemented on a single IC.

In an embodiment, the PHY processor 20 scrambles an MPDU (e.g., a PHY service data unit) based on a scramble seed.

In various embodiments, the MAC processor 18 and the PHY processor 20 are configured to operate according to a first communication protocol (e.g., a High Efficiency, HE, or 802.11ax communication protocol). In some embodiments, the MAC processor 18 and the PHY processor 20 are also configured to operate according to a second communication protocol (e.g., according to the IEEE 802.11ac Standard). In yet another embodiment, the MAC processor 18 and the PHY processor 20 are additionally configured to operate according to the second communication protocol, a third communication protocol, and/or a fourth communication protocol (e.g., according to the IEEE 802.11a Standard and/or the IEEE 802.11n Standard).

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 or another communication device (not shown) is not configured to operate according to the first communication protocol but is configured to operate according to at least one of the second communication protocol, the third communication protocol, and/or the fourth communication protocol (referred to herein as a "legacy client station").

The client station 25-1 includes a host processor 26 coupled to a network interface 27. In an embodiment, the network interface 27 includes one or more ICs configured to operate as discussed below. The network interface 27 includes a MAC processor 28 and a PHY processor 29. The PHY processor 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In some embodiments, the client station 25-1 includes a higher number of antennas 34 than transceivers 30, and antenna switching techniques are utilized. In an embodiment, the MAC processor 28 is implemented on at least a first IC, and the PHY processor 29 is implemented on at least a second IC. In an embodiment, at least a portion of the MAC processor 28 and at least a portion of the PHY processor 29 are implemented on a single IC.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol, the third communication protocol, and/or the fourth communication protocol.

In an embodiment, one or both of the client stations 25-2 and 25-3, has a structure that is the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the MAC processor 18 and the PHY processor 20 of the AP 14 are configured to generate data units conforming to the first communication protocol and having formats described herein. In an embodiment, the MAC processor 18 is configured to implement MAC layer functions, including MAC layer functions of the first communication protocol. In an embodiment, the PHY processor 20 is configured to implement PHY functions, including PHY functions of the first communication protocol. For example, in an embodiment, the MAC processor 18 is configured to generate MAC layer data units such as MPDUs, MAC control frames, etc., and provide the MAC layer data units to the PHY processor 20. In an embodiment, the PHY processor 20 is configured to receive MAC layer data units from the MAC processor 18 and encapsulate the MAC layer data units to generate PHY data units such as PHY protocol data units (PPDUs) for transmission via the antennas 24. Similarly, in an embodiment, the PHY processor 20 is configured to receive PHY data units that were received via the antennas 24, and extract MAC layer data units encapsulated within the PHY data units. In an embodiment, the PHY processor 20 provides the extracted MAC layer data units to the MAC processor 18, which processes the MAC layer data units.

The transceiver(s) 21 is/are configured to transmit the generated data units via the antenna(s) 24. Similarly, the transceiver(s) 21 is/are configured to receive data units via the antenna(s) 24. The MAC processor 18 and the PHY processor 20 of the AP 14 are configured to process received data units conforming to the first communication protocol and having formats described hereinafter and to determine that such data units conform to the first communication protocol, according to various embodiments.

In various embodiments, the MAC processor 28 and the PHY processor 29 of the client station 25-1 are configured to generate data units conforming to the first communication protocol and having formats described herein. In an embodiment, the MAC processor 28 is configured to implement MAC layer functions, including MAC layer functions of the first communication protocol. In an embodiment, the PHY processor 29 is configured to implement PHY functions, including PHY functions of the first communication protocol. For example, in an embodiment, the MAC processor 28 is configured to generate MAC layer data units such as MPDUs, MAC control frames, etc., and provide the MAC layer data units to the PHY processor 29. In an embodiment, the PHY processor 29 is configured to receive MAC layer data units from the MAC processor 28 and encapsulate the MAC layer data units to generate PHY data units such as PPDUs for transmission via the antennas 34. Similarly, in an embodiment, the PHY processor 29 is configured to receive PHY data units that were received via the antennas 34, and extract MAC layer data units encapsulated within the PHY data units. In an embodiment, the PHY processor 29 provides the extracted MAC layer data units to the MAC processor 28, which processes the MAC layer data units.

The transceiver(s) 30 is/are configured to transmit the generated data units via the antenna(s) 34. Similarly, the transceiver(s) 30 is/are configured to receive data units via the antenna(s) 34. The MAC processor 28 and the PHY processor 29 of the client station 25-1 are configured to process received data units conforming to the first communication protocol and having formats described hereinafter and to determine that such data units conform to the first communication protocol, according to various embodiments.

In various embodiments, one or both of the AP 14 and the client station 25 are configured to transmit and/or receive OFDM data units that include simultaneously transmitted control frames. In an embodiment, for example, the AP 14 transmits a first control frame to a plurality of communication devices (e.g., client stations 25) where the first control frame is duplicated across each of a plurality of sub-channels of an OFDM channel and indicates that the plurality of communication devices are requested to simultaneously transmit respective control frames to the AP 14. At least some of the respective control frames are transmitted via a same sub-channel of the plurality of sub-channels having a smallest bandwidth of the wireless local area network. In an embodiment, the respective control frames that are transmitted via the same sub-channel are scrambled using a same scramble seed so that the AP 14 is able to decode the control frames.

Figure 2:
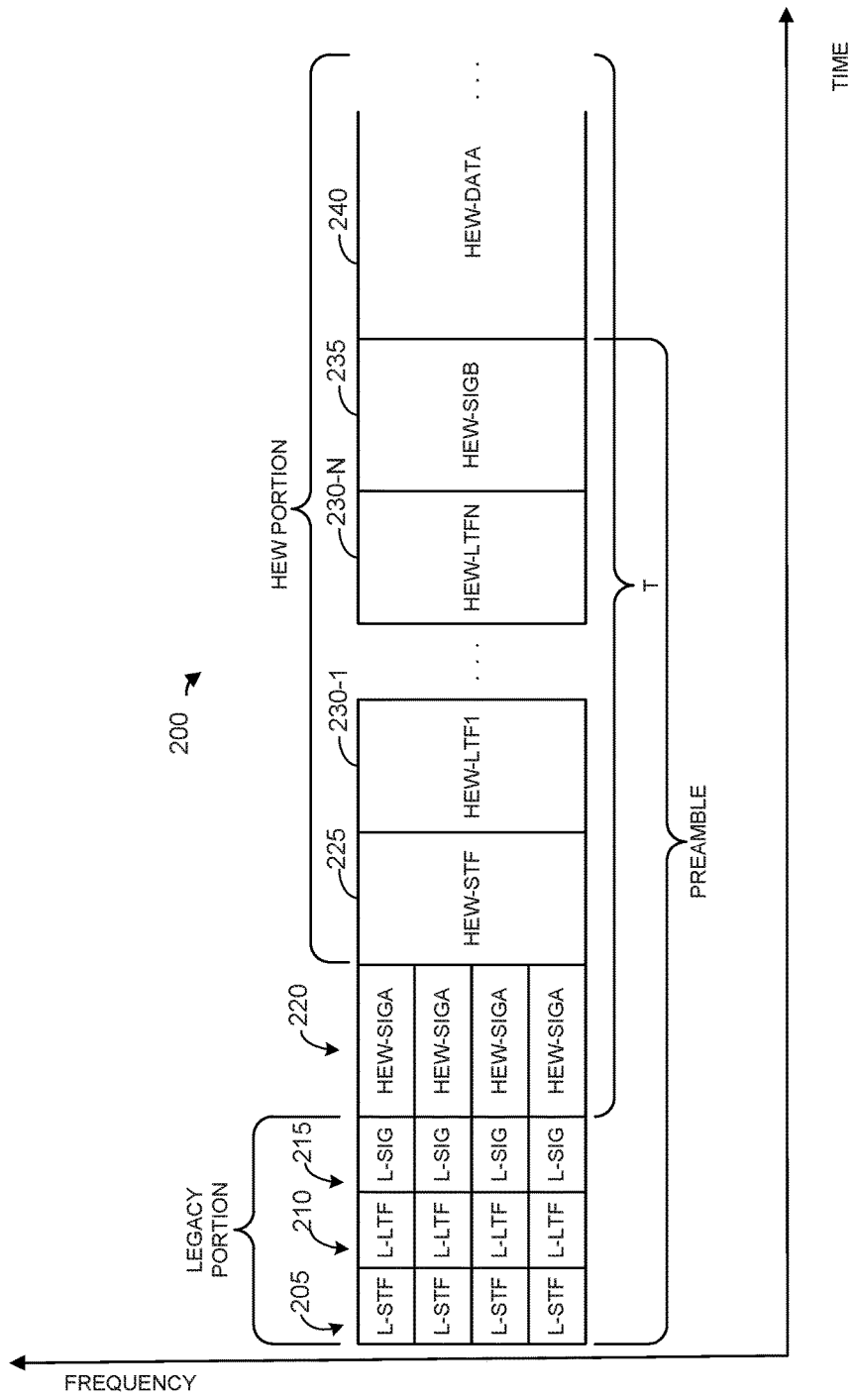
FIG. 2 is a diagram of an example orthogonal frequency division multiplexing (OFDM) data unit, according to an embodiment.

FIG. 2 is a diagram of an OFDM data unit 200, according to an embodiment. In an embodiment, an AP (e.g., the AP 14) is configured to transmit to a client station (e.g., the client station 25-1) using orthogonal frequency division multiplexing (OFDM) modulation, according to an embodiment. In an embodiment, a client station (e.g., the client station 25-1) is configured to transmit the data unit 200 to an AP (e.g., the AP 14). The data unit 200 conforms to the HEW protocol and occupies an 80 MHz band. In other embodiments, data units similar to the data unit 200 occupy different bandwidths such as 20 MHz, 40 MHz, 120 MHz, 160 MHz, or any suitable bandwidth. The data unit 200 is suitable for "mixed mode" situations, such as when the WLAN 10 includes a client station (e.g., the legacy client station 25-4) that conforms to the legacy protocol, but not the HEW protocol. The data unit 200 can be utilized in other situations as well.

The data unit 200 includes a preamble having four legacy short training fields (L-STFs) 205; four legacy long training fields (L-LTFs) 210; four legacy signal fields (L-SIGs) 215; four first high efficiency WLAN signal fields (HEW-SIGAs) 220; a high efficiency WLAN short training field (HEW-STF) 225; N very high efficiency WLAN long training fields (HEW-LTFs) 230, where N is an integer; and a second high efficiency WLAN signal field (HEW-SIGB) 235. The data unit 200 also includes a high efficiency WLAN data portion (HEW-DATA) 240. The L-STFs 205, the L-LTFs 210, and the L-SIGs 215 form a legacy portion. The HEW-SIGA 220, HEW-STF 225, the HEW-LTFs 230, the HEW-SIGB 235, and the HEW-DATA 240 form a high efficiency WLAN (HEW) portion.

Each of the L-STFs 205, each of the L-LTFs 210, each of the L-SIGs 215, and each of the HEW-SIGAs 220 occupy a 20 MHz band, in one embodiment. The data unit 200 is described as having an 80 MHz contiguous bandwidth for the purposes of illustrating an example frame format, but such frame format is applicable to other suitable bandwidths (including noncontiguous bandwidths). For instance, although the preamble of the data unit 200 includes four of each of the L-STFs 205, the L-LTFs 210, the L-SIGs 215, and the HEW-SIGAs 220, in other embodiments in which an OFDM data unit occupies a cumulative bandwidth other than 80 MHz, such as 20 MHz, 40 MHz, 120 MHz, 160 MHz, etc., a different suitable number of the L-STFs 205, the L-LTFs 210, the L-SIGs 215, and the HEW-SIGAs 220 are utilized accordingly. For example, for an OFDM data unit occupying a 20 MHz cumulative bandwidth, the data unit includes one of each of the L-STFs 205, the L-LTFs 210, the L-SIGs 215, and the HEW-SIGAs 220; a 40 MHz bandwidth OFDM data unit includes two of each of the fields 205, 210, 215, and 220; a 120 MHz bandwidth OFDM data unit includes six of each of the fields 205, 210, 215, and 220; a 160 MHz bandwidth OFDM data unit includes eight of each of the fields 205, 210, 215, and 220, and so on, according to some embodiments.

In the example data unit 200, each of the HEW-STF 225, the HEW-LTFs 230, the HEW-SIGB 235, and the HEW-DATA 240 occupies the entire 80 MHz cumulative bandwidth of the data unit 200. Similarly, in the case of an OFDM data unit conforming to the HEW protocol and occupying a cumulative bandwidth such as 20 MHz, 40 MHz, 120 MHz, or 160 MHz, each of the HEW-STF 225, the HEW-LTFs 230, the HEW-SIGB 235, and the HEW-DATA 240 occupies the corresponding entire cumulative bandwidth of the data unit, in some embodiments.

In some embodiments, the 80 MHz band of the data unit 200 is not contiguous, but includes two or more smaller bands, such as two 40 MHz bands, separated in frequency. Similarly, for other OFDM data units having different cumulative bandwidths, such as a 160 MHz cumulative bandwidth, in some embodiments the band is not contiguous in frequency. Thus, for example, the L-STFs 205, the L-LTFs 210, the L-SIGs 215, and the HEW-SIG2s 220 occupy two or more bands that are separated from each other in frequency, and adjacent bands are separated in frequency by at least one MHz, at least five MHz, at least 10 MHz, at least 20 MHz, for example, in some embodiments.

According to an embodiment, each of the L-STFs 205 and each of the L-LTFs 210 have a format as specified in a legacy protocol such as the IEEE 802.11a Standard, the IEEE 802.11n Standard, and/or the IEEE 802.11ac Standard. In an embodiment, each of the L-SIGs 215 has a format at least substantially as specified in legacy protocol (e.g., the IEEE 802.11a Standard, the IEEE 802.11n Standard, and/or the IEEE 802.11ac Standard). In such embodiments, the length and rate subfields in the L-SIGs 215 are set to indicate the duration T corresponding to the remainder of the data unit 200 after the legacy portion. This permits client stations that are not configured according to the HEW protocol to determine an end of the data unit 200 for carrier sense multiple access/collision avoidance (CSMA/CA) purposes, for example. For example, the legacy client stations determine the duration of the remainder of the data unit 200 and refrain from accessing the medium (or at least transmitting in the medium) for the duration of the remainder of the data unit 200, in an embodiment. In other embodiments, each of the L-SIGs 215 has a format at least substantially as specified in legacy protocol (e.g., the IEEE 802.11a Standard, the IEEE 802.11n Standard, and/or the IEEE 802.11ac Standard) but with length field in the L-SIGs 215 set to indicate a duration of the time remaining in a transmission opportunity during which the data unit 200 is transmitted. In such embodiments, client stations that are not configured according to the HEW protocol determine an end of a transmission opportunity (TXOP) and refrain from accessing the medium (or at least transmitting in the medium) for the duration of the TXOP, in an embodiment.

In the data unit 200, the frequency domain symbols of the legacy portion are repeated over four 20 MHz subbands of the 80 MHz band. Legacy client stations that are configured to operate with 20 MHz bandwidth will recognize a legacy preamble in any of the 20 MHz subbands. In some embodiments, the modulations of the different 20 MHz subband signals are rotated by different angles. In one example, a first subband is rotated 0 degrees, a second subband is rotated 90 degrees, a third subband is rotated 180 degrees, and a fourth subband is rotated 270 degrees, in an embodiment. In other examples, different suitable rotations are utilized. As just one example, a first subband is rotated 45 degrees, a second subband is rotated 90 degrees, a third subband is rotated −45 degrees, and a fourth subband is rotated −90 degrees, in an embodiment.

In some embodiments, the modulations of the HEW-SIGAs 220 in the different 20 MHz subbands are rotated by different angles. In one example, a first subband is rotated 0 degrees, a second subband is rotated 90 degrees, a third subband is rotated 180 degrees, and a fourth subband is rotated 270 degrees, in an embodiment. In other examples, different suitable rotations are utilized. As just one example, a first subband is rotated 45 degrees, a second subband is rotated 90 degrees, a third subband is rotated −45 degrees, and a fourth subband is rotated −90 degrees, in an embodiment. In an embodiment, the same rotations utilized in the legacy portion are utilized for the HEW-SIGAs 220. In at least some examples, the HEW-SIGAs 220 are collectively referred to as a single high efficiency WLAN signal field (HEW-SIGA) 220.

In an embodiment, the AP 14 transmits respective OFDM data units, such as the OFDM data unit 200, simultaneously to multiple client stations 25 simultaneously as parts of a downlink OFDMA transmission from the AP 14 to the multiple client stations 25. In an embodiment, the AP 14 transmits the respective OFDM data units in respective sub-channels allocated to the client stations. Similarly, in an embodiment, multiple client stations 25 transmit respective OFDM data units, such as the OFDM data unit 200, simultaneously to the AP 14 as parts of an uplink OFDMA transmission from the multiple client stations 25 to the AP 14. In an embodiment, the client stations 25 transmit the respective OFDM data units in respective sub-channels allocated to the client stations 25. In an embodiment, a sub-channel allocated to a particular client station corresponds to a single sub-channel block of adjacent sub-carriers of the communication channel. In an embodiment, a sub-channel block allocated to a particular client station includes several sub-channel blocks of adjacent sub-carriers, each sub-channel block having a subset of sub-carriers allocated to the particular client station. In an embodiment, the several sub-channel blocks corresponding to a particular client station are uniformly distributed over the communication channel. In another embodiment, the several sub-channel blocks are not necessarily uniformly distributed over the communication channel. For example, the several sub-channel blocks are randomly distributed over the communication channel, or are distributed according to another suitable distribution scheme over the communication channel, in some embodiments.

FIGS. 3A-3C are diagrams of example channel allocation schemes in an 80 MHz communication channel, according to various embodiments. In each of FIGS. 3A-3C, respective 20 MHz sub-channels are allocated to each of four client stations 25 (STA1, STA2, STA3 and STA4). In FIG. 3A, each of the sub-channels, allocated to a particular one of STA1, STA2, STA3 and STA4, consists of a single sub-channel block of adjacent sub-carriers allocated to the particular station. In FIG. 3B, each of the sub-channels, allocated to a particular one of STA1, STA2, STA3 and STA4, consists of four respective sub-channel blocks uniformly spaced over the entire 80 MHz channel. In FIG. 3C, each of the sub-channels consists of four respective non-uniformly (e.g., randomly) spaced over the entire 80 MHz channel. In each of FIGS. 3B and 3C, each of the sub-channel blocks allocated to a particular client station includes a block of adjacent sub-carriers, wherein the block of adjacent sub-carriers includes a subset of sub-carriers, of the 80 MHz channel, allocated to the particular client station, according to an embodiment.

In some embodiments, a sub-channel having a suitable bandwidth less than the smallest bandwidth of the WLAN can be allocated to a client station. For example, in some embodiments in which the smallest bandwidth of the WLAN 10 is 20 MHz, sub-channel having bandwidth less than 20 MHz, such as sub-channels having bandwidths of 10 MHz and/or 5 MHz can be allocated to client stations, in at least some scenarios.

FIGS. 4A, 4B, 4C and 4D are diagrams illustrating example OFDM sub-channels of an 80 MHz communication channel, according to various embodiments. In FIG. 4A, the communication channel is partitioned into four contiguous sub-channels, each having a bandwidth of 20 MHz. The OFDM sub-channels include independent data streams for four client stations. In FIG. 4B, the communication channel is partitioned into two contiguous sub-channel channels, each having a bandwidth of 40 MHz. The OFDM sub-channels include independent data streams for two client stations. In FIG. 4C, the communication channel is partitioned into three contiguous OFDM sub-channels. Two OFDM sub-channels each have a bandwidth of 20 MHz. The remaining OFDM sub-channel has a bandwidth of 40 MHz. The OFDM sub-channels include independent data streams for three client stations. In FIG. 4D, the communication channel is partitioned into four contiguous OFDM sub-channels. Two OFDM sub-channels each have a bandwidth of 10 MHz, one OFDM sub-channel has a bandwidth of 20 MHz, and one OFDM sub-channel has a bandwidth of 40 MHz. The OFDM sub-channels include independent data streams for three client stations. In an embodiment, one 20 MHz channel includes 64 tones. In other embodiments, one 20 MHz channel includes a different number of tones, for example, 32 tones, 128 tones, 256 tones, or another suitable number of tones.

Although in FIGS. 4A, 4B, 4C, and 4D the OFDM sub-channels are contiguous across the communication channel, in other embodiments the OFDM sub-channels are not contiguous across the communication channel (i.e., there are one or more gaps between the OFDM sub-channels). In an embodiment, each gap is at least as wide as one of the OFDM sub-channel blocks. In another embodiment, at least one gap is less than the bandwidth of an OFDM sub-channel block. In another embodiment, at least one gap is at least as wide as 1 MHz. In an embodiment, different OFDM sub-channel blocks are transmitted in different channels defined by the H-EE 802.11a, 802.11n and/or 802.11ac Standards. In one embodiment, the AP includes a plurality of radios and different OFDM sub-channel blocks are transmitted using different radios.

In FIGS. 4A, 4B, 4C and 4D, each sub-channel corresponds to a single sub-channel block of adjacent sub-carriers allocated to a particular client station. In other embodiments, each of at least some sub-channels of an 80 MHz channel corresponds to several sub-channel blocks, each having adjacent sub-carriers, where the several sub-channel blocks collectively comprise the sub-carriers allocated to a particular client station. The several sub-channel blocks corresponding to a particular client station are uniformly or non-uniformly distributed over the 80 MHz channel, for example as described above with respect to FIGS. 3B and 3C, in some embodiments. In such embodiments, an independent data stream for the particular client station is accordingly distributed over the 80 MHz channel. In some embodiments, a 20 MHz channel is allocated to multiple client stations.

Figure 5:
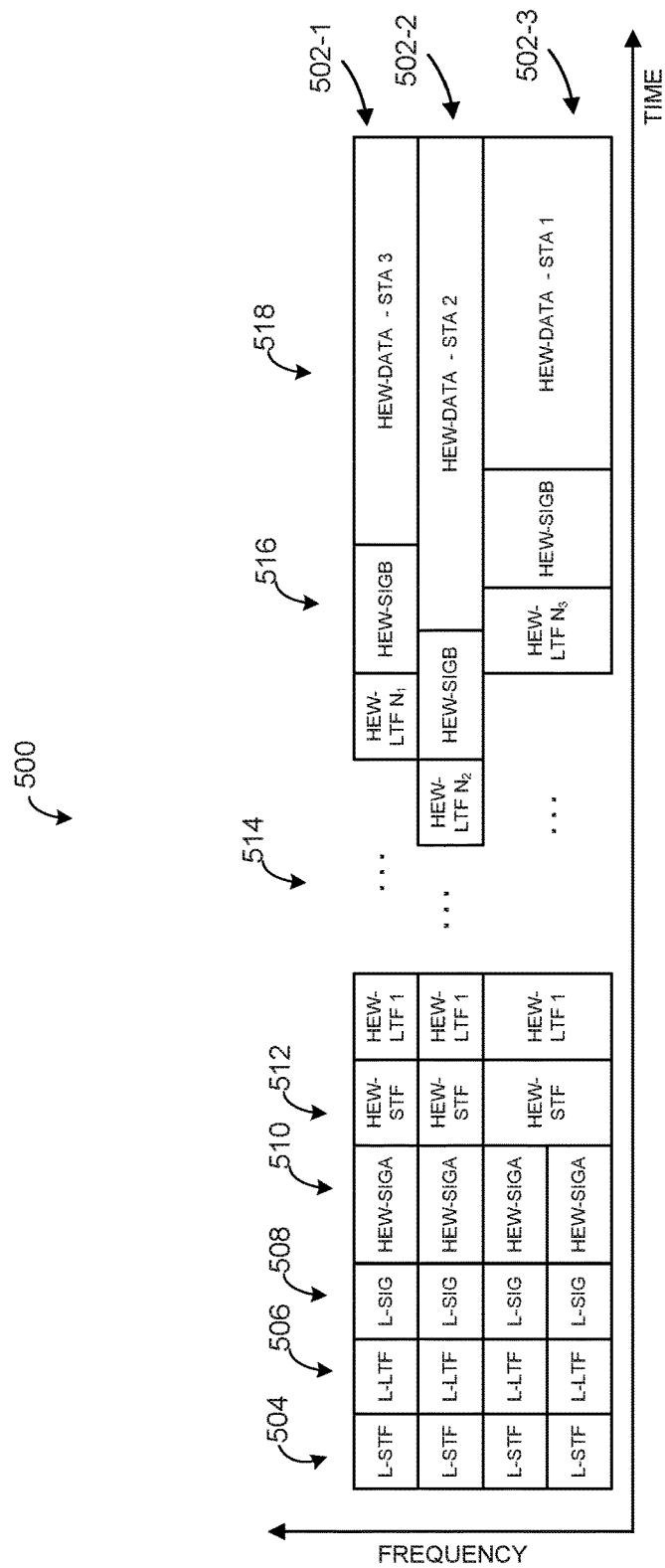
FIG. 5 is a diagram of an example orthogonal frequency division multiple access (OFDMA) data unit, according to an embodiment.

FIG. 5 is a diagram of an example OFDMA data unit 500, according to an embodiment. The OFDMA data unit 500 includes a plurality of OFDM data unit 502-1, 502-2 and 502-3 having independent data streams corresponding to three client stations 25. In an embodiment, each OFDM data unit 502 is the same as or similar to the OFDM data unit 200 of FIG. 2. In an embodiment, the AP 14 transmits the OFDM data units 502-1, 502-2, 502-3 to different client stations 25 via respective OFDM sub-channels within the OFDMA data unit 500. In another embodiment, different client stations 25 transmit respective OFDM data units 502-1, 502-2, 502-3 to the AP 14 in respective OFDM sub-channels within the OFDMA data unit 500. In this embodiment, The AP 14 receives the OFDM data units 502-1, 502-2, 502-3 from the client stations 25 via respective OFDM sub-channels of within the OFDMA data unit 500, in this embodiment.

Each of the OFDM data units 502-1, 502-2, 502-3 conforms to a communication protocol that defines OFDMA communication, such as the HEW communication protocol, in an embodiment. In an embodiment in which the OFDMA data unit 500 corresponds to a downlink OFDMA data unit, the OFDMA data unit 500 is generated by the AP 14 such that each OFDM data unit 502 is transmitted to a respective client station 25 via a respective sub-channel of the WLAN 10 allocated for downlink transmission of the OFDMA data unit 500 to the client station. Similarly, an embodiment in which the OFDMA data unit 500 corresponds to an uplink OFDMA data unit, the AP 14 receives the OFDM data units 502 via respective sub-channels of the WLAN 10 allocated for uplink transmission of the OFDM data units 502 from the client stations, in an embodiment. For example, the OFDM data unit 502-1 is transmitted via a first 20 MHZ sub-channel of the WLAN 10, the OFDM data unit 502-2 is transmitted via a second 20 MHz sub-channel of the WLAN 10, and the OFDM data unit 502-3 is transmitted via a 40 MHz sub-channel of the WLAN 10, in the illustrated embodiment.

Each of the OFDM data units 502 is the same as or similar to the OFDM data unit 200 of FIG. 2. In an embodiment, each of the OFDM data units 502 includes a preamble including one or more legacy short training fields (L-STF) 504, one or more legacy long training fields (L-LTF) 506, one or more legacy signal fields (L-SIG) 508, one or more first high efficiency WLAN signal field (HEW-SIG-A) 510, N HEW long training fields (HEW-LTF) 514 and a second HEW signal field (HEW-SIGB) 516. Additionally, each OFDM data unit 502 includes a high efficiency WLAN data portion (HEW-DATA) 518. In an embodiment, each L-STF field 504, each L-LTF field 506, each L-SIG field 508 and each HEW-SIGA field 510 occupies a smallest bandwidth supported by the WLAN 10 (e.g., 20 MHz). In an embodiment, if an OFDM data unit 502 occupies a bandwidth that is greater than the smallest bandwidth of the WLAN 10, then each L-STF field 504, each L-LTF field 506, each L-SIG field 508 and each HEW-SIGA field 510 is duplicated in each smallest bandwidth portion of the OFDM data unit 502 (e.g., in each 20 MHz portion of the data unit 502). On the other hand, each HEW-STF field 512, each HEW-LTF field 514, each HEW-SIGB field 516 and each HEW data portion 518 occupies an entire bandwidth of the corresponding OFDM data unit 502, in an embodiment. For example, the OFDM data unit 502-3 occupies 40 MHz, wherein L-STF field 504, the L-LTF field 506, L-SIG field 508 and HEW-SIGH fields 510 is duplicated in the upper and the lower 20 MHz bands of the OFDM data unit 502-3, while each of the HEW-STF field 512, each of the HEW-LTF fields 514, each of the HEW-SIGB field 516 and each of the HEW data portion 518 occupies the entire 40 MHz bandwidth of the data unit 502, in the illustrated embodiment.

In an embodiment, padding is used in one or more of the OFDM data units 502 to equalize lengths of the OFDM data units 502. Accordingly, the length of each of the OFDM data units 502 is padded as needed to correspond to the length of the OFDMA data unit 500, in this embodiment. Ensuring that the OFDM data units 502 are of equal lengths synchronizes transmission of acknowledgment frames by client stations 25 that receive the data units 502, in an embodiment. In an embodiment, one or more of the OFDM data units 502 is an aggregate MAC service data units (A-MPDU) (e.g., a very high throughput (VHT) A-MPDU that includes multiple aggregated VHT MAC service data units (MPDUs), an HEW A-MPDU that includes multiple aggregated HEW MAC service data units (MPDUs), or another suitable aggregated data unit that includes multiple aggregated MAC service data units (MPDUs)), which is in turn included in a PHY protocol data unit (PPDU). In another embodiment, one or more of the OFDM data units 502 is a single MPDU (e.g., a single VHT MPDU, a single HEW MPDU, or another suitable non-aggregated data unit) which is in turn included in a PPDU. In an embodiment, padding (e.g., zero-padding) within one or more of the A-MPDUs 502 or single MPDUs 502 is used to equalize the lengths of the data units 502, and to synchronize transmission of acknowledgement frames corresponding to the OFDMA data unit 500.

Figure 6A:
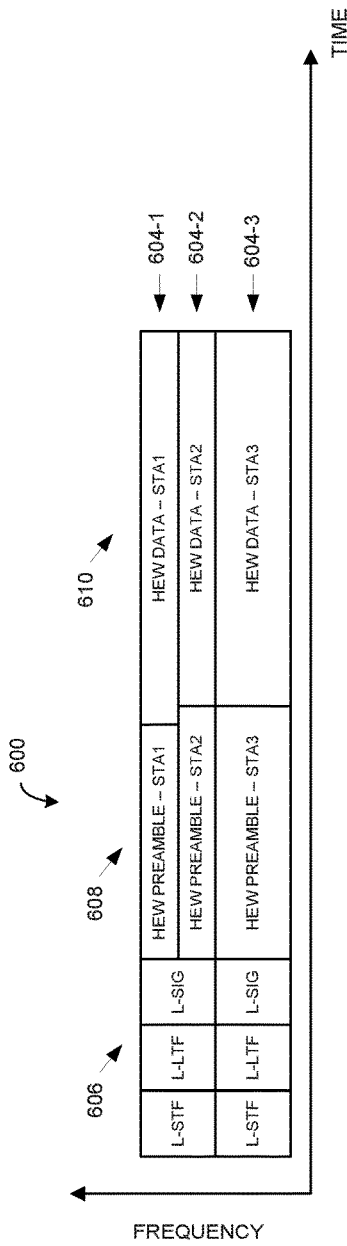
FIG. 6A is a diagram of an example OFDMA data unit, according to another embodiment.

FIG. 6A is a diagram of an example OFDMA data unit 600, according to an embodiment. The OFDMA data unit 600 includes a plurality of OFDM data unit 604-1, 604-2 and 604-3 having independent data streams corresponding to three client stations 25. In an embodiment, the AP 14 transmits the OFDM data units 604-1, 604-2, 604-3 to different client stations 25 via respective OFDM sub-channels within the OFDMA data unit 600. In another embodiment, different client stations 25 transmit respective OFDM data units 604-1, 604-2 and 604-3 to the AP 14 in respective OFDM sub-channels within the OFDMA data unit 600. In this embodiment, the AP 14 receives the OFDM data units 602-1, 602-2, 602-3 from the client stations 25 via respective OFDM sub-channels of within the OFDMA data unit 600.

Each of the OFDM data units 604-1, 604-2 occupies a respective sub-channel having a bandwidth that is less than a smallest channel of the WLAN 10. For example, the smallest channel of the WLAN 10 is 20 MHz, and each of OFDM data units 604-1, 604-2 occupies a respective sub-channel having a bandwidth of 10 MHz, in an embodiment. The OFDM data units 604-1 and 604-2 collectively span the smallest bandwidth channel of the WLAN 10, in an embodiment. The OFDM data unit 604-3 occupies a smallest bandwidth of the WLAN 10, in an embodiment. For example, the OFDM data unit 604-3 occupies 20 MHz, in an embodiment.

In an embodiment, the OFDM data units 604-1 and 604-2 share a legacy preamble 606 that occupies the smallest bandwidth of the WLAN 10 10 (e.g., 20 MHz) collectively spanned by the OFDM data units 604-1 and 604-2. The OFDM data unit 604-3 includes a legacy preamble 606 that spans the bandwidth of the OFDM data unit 604-3. In an embodiment, the legacy preamble 606 corresponding to the OFDM data units 604-1 and 604-2 and the legacy preamble 606 corresponding to the OFDM data unit 604-3 are identical. In an embodiment, each legacy preamble 606 is the same as the legacy preamble 202 of the data unit 200 of FIG. 2. For example, each legacy preamble 606 includes an L-STF, and L-LTF and an L-SIG that generally conforms to the legacy communication protocol, in an embodiment.

In an embodiment, each of the OFDM data units 604-1 and 604-2 includes a respective HEW preamble 608 and a respective data portion 610 that each spans the corresponding bandwidth smaller than the smallest channel of the WLAN 10 (e.g., 10 MHz, 5 MHz, 2 MHz, or other suitable bandwidth). The OFDM data unit 604-3 includes a HEW preamble 608 and a data portion 610 that each spans the bandwidth of the sub-channel block 604-3, in an embodiment. In an embodiment, each HEW preamble 608 is the same as the HEW preamble 210 of the data unit 200 of FIG. 2. For example, although not shown in FIG. 6, each HEW preamble 608 includes a HEW-SIGA, a HEW-STF, one or more HEW-LTFs and a HEW-SIGB, in an embodiment. In an embodiment, the content of each of the HEW preambles 608 can be variant for different client stations depending on factors such as rate, data quantity, configuration (e.g., number of antennas, number of supported multiple input, multiple output (MIMO) data streams, etc.) of the different client stations.

In some embodiments, one or more of the data portions 610 are omitted from the corresponding one or more OFDM data units 604.

Figure 6B:
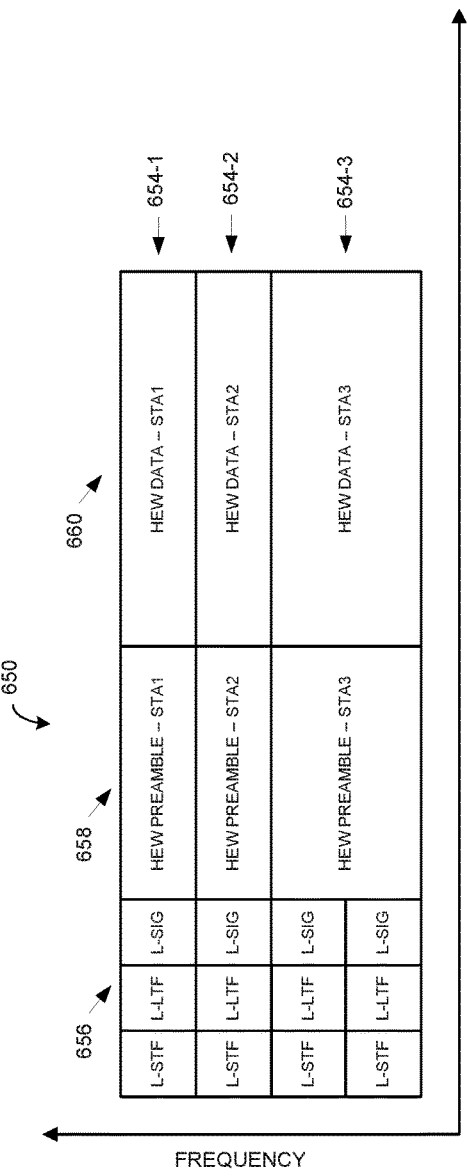
FIG. 6B is a diagram of an example OFDMA data unit, according to another embodiment.

FIG. 6B is a diagram of an example OFDMA data unit 650, according to an embodiment. The OFDMA data unit 650 includes a plurality of OFDM data unit 654-1, 654-2 and 654-3 having independent data streams corresponding to three client stations 25. In an embodiment, the AP 14 transmits the OFDM data units 654-1, 654-2, 654-3 to different client stations 25 via respective OFDM sub-channels within the OFDMA data unit 650. In another embodiment, different client stations 25 transmit respective OFDM data units 654-1, 654-2 and 654-3 to the AP 14 in respective OFDM sub-channels within the OFDMA data unit 650. In this embodiment, the AP 14 receives the OFDM data units 654-1, 654-2, 654-3 from the client stations 25 via respective OFDM sub-channels of within the OFDMA data unit 650.

In an embodiment, the OFDMA data unit 650 occupies an 80 MHz bandwidth. Each of the OFDM data units 654-1 and 654-2 occupies a respective 20 MHz sub-channel of the OFDMA data unit 650, while the OFDM data unit 654-3 occupies a 40 MHz sub-channel of the OFDMA data unit 650, in an embodiment. In an embodiment, the OFDMA data unit 650 includes several legacy preambles 656. In particular, each of the OFDM data units 654-1 and 654-2 includes a legacy preamble 656 that spans the 20 MHz sub-channel occupied by the corresponding OFDM data unit, and the data unit 654-3 includes a legacy preamble 656 replicated in each 20 MHz band of the 40 MHz band occupied by the data unit 654, in an embodiment. In an embodiment, each of the legacy preambles 656 is the same as the legacy preamble 202 of the data unit 200 of FIG. 1. Each of the legacy preambles 656 includes one or more L-STFs, one or more L-LTFs and one or more L-SIGs, in an embodiment.

In an embodiment, each of the OFDM data units 654 is directed to a particular client station and includes a HEW preamble 656 for the particular client station. In an embodiment, each of the OFDM data units 654 also includes a data portion 660. In another embodiment, each of one or more of the OFDM data units 654 omits the data portion 660. In an embodiment, one or more of the OFDM data units 654 is not directed to a particular client station. For example, each of one or more of the OFDM data units 654 is directed to multiple client stations, such as a multi-user a multi-user group of client stations, a multi-cast group of client stations, for example.

In an embodiment, each HEW preamble 658 is the same as the HEW preamble 210 of the data unit 200 of FIG. 2. For example, although not show in FIG. 6B, each includes a HEW-SIGA (or two HEW-SIGAs each spanning a smallest bandwidth of the legacy protocol, as would be in the case of the sub-channel block 654-3), a HEW-STF, one or more HEW-LTFs and a HEW-SIGB, in an embodiment. In an embodiment, the content of each of the HEW preambles 658 can be variant for different client stations depending on factors such as rate, data quantity, configuration (e.g., number of antennas, number of supported multiple input, multiple output (MIMO) data streams, etc.) of the different client stations. In an embodiment, the HEW preamble 658 and, if present, the corresponding HEW data portion 660 comprise an OFDM data unit directed to a particular client station, or, alternatively, an OFDM data unit or frame directed to multiple client stations.

In various embodiments described below, frame exchanges include transmission of OFDMA data units, such as the OFDMA data unit 500 of FIG. 5, the OFDMA data unit 600 of FIG. 6A or the OFDMA data unit 650 of FIG. 6B, or other suitable OFDM data units, such as OFDM data units having other suitable bandwidths and/or other suitable sub-channel allocations, for example. Such OFDMA data units are downlink OFDMA data units that include respective OFDM data units simultaneously transmitted by an AP to a plurality of client stations in some cases, and are uplink OFDMA data units that include respective OFDM data units simultaneously transmitted form a plurality of client stations to an AP, in other cases.

Figure 7:
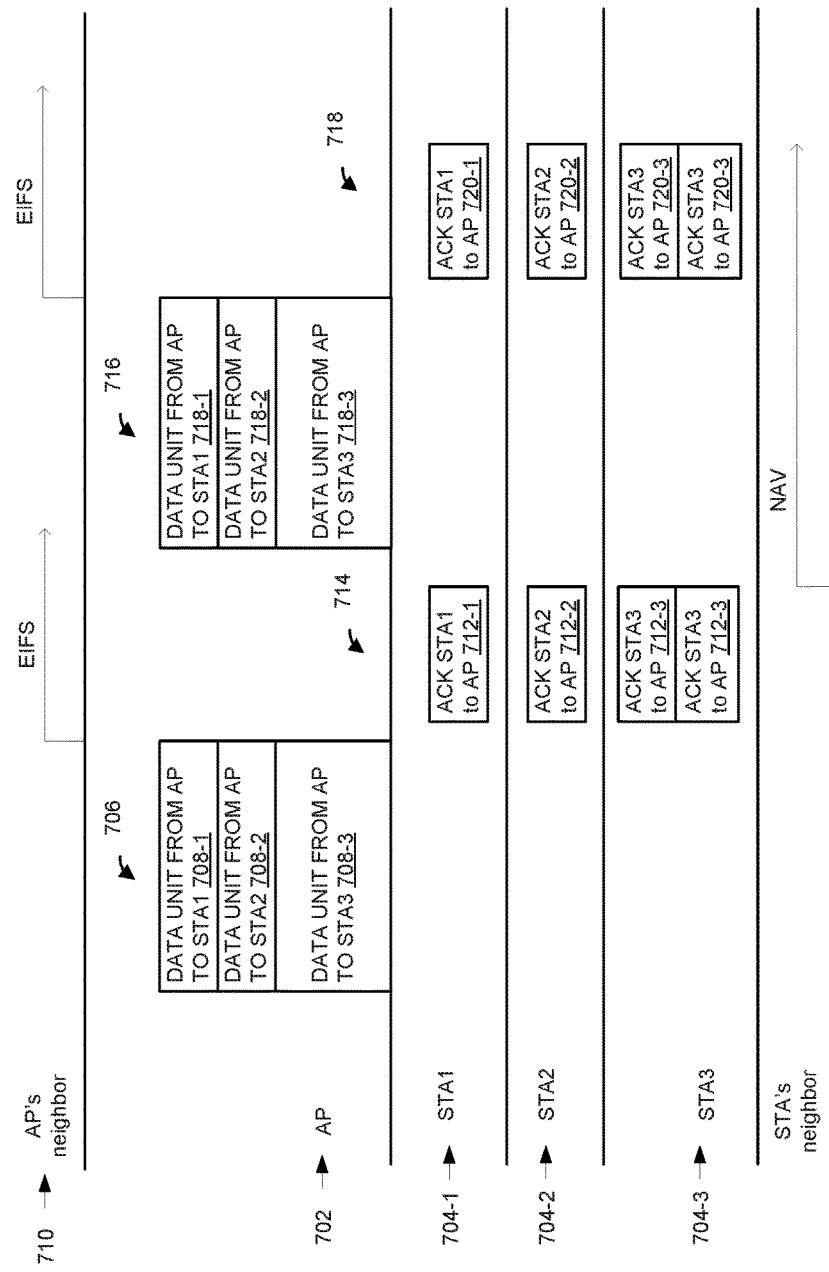
FIG. 7 is a diagram illustrating a frame exchange between an AP and a plurality of client stations, according to an embodiment.

FIG. 7 is diagram illustrating a frame exchange 700 between an AP and a plurality of client stations, according to an embodiment. In particular, an AP 702 utilizes OFDMA communication to communicate with a plurality of client stations 704, including a first client station STA1 704-1, a second client station STA2 704-2, and a third client station STA3 704-3, in the illustrated embodiment. With reference to FIG. 1, in an embodiment, the AP 702 corresponds to the AP 14 and the client stations 704 correspond to different ones of the client stations 25.

The AP 702 transmits an OFDMA data unit 706 directed to the plurality of client stations 704. In an embodiment, the OFDMA data unit 706 includes respective OFDM data units 708 directed to each of the client stations 704 and are transmitted in respective sub-channels allocated to the client stations 704. For example, in the illustrated embodiment, a first OFDM data unit 708-1 is transmitted in a first 20 MHz sub-channel allocated to the client station STA1 704-1, a second OFDM data unit 708-2 is transmitted in a second 20 MHz sub-channel allocated to the client station STA2 704-2, and a third OFDM data unit 708-3 is transmitted in a 40 MHz sub-channel allocated to the client station STA3 704-3. In an embodiment the OFDMA data unit 706 includes, in a preamble (e.g., in a signal field of a HEW preamble, such as in the HEW-SIGA field of the HEW preamble) of the data unit 706, indications of the respective sub-channels allocated to the client stations 704. Each client station 704 receives the preamble of the OFDMA data unit 706 in a primary channel of the WLAN, determines the particular sub-channel allocated to the client station 704 based on an indication included in the preamble of the data unit 706, tunes to the sub-channel allocated to the client station 704, and receives its portion of the data unit 706 (i.e., the OFDM data unit 708 that includes data for the client station 704) in the sub-channel allocated to the client station 704, in an embodiment.

In an embodiment, the OFDMA data unit 706 includes a legacy signal field that indicates, to legacy and/or non-OFDMA devices, a duration of the data unit 706. Legacy and/or non-OFDMA devices that receive the legacy signal field of the data unit 706 are able to determine the length of the data unit 706 and to defer transmission for the duration corresponding to the length of the data unit 706, in an embodiment. Further, because a legacy and/or non-OFDMA device detects an error when trying to decode any non-legacy portion of the data unit 706, the legacy and/or non-OFDMA device sets an extended interframe space (EIFS) timer to count down for EIFS duration after the end of the data unit 706. Thus, the legacy and/or non-OFDMA device further defers transmission for the duration corresponding to duration of EIFS after the end for the data unit 706.

For example, a communication device 710, located within the communication range of the AP 702, is not configured to operate according to the HEW communication protocol and/or does not support OFDMA communication. In an embodiment, the communication device 710 determines the length of the of the data unit 706 based on the duration indicated in the legacy signal field of the data unit 706. The communication device 710, however, detects an error in the data unit 706, and accordingly sets an EIFS timer to EIFS duration after the end of the data unit 706. Accordingly, the communication device 710 refrains from transmitting in the medium after the end of the data unit 706 for the duration of EIFS after the end of the data unit 702.

In an embodiment, client stations STA1 704-1, STA2 704-2, and STA3 704-3 receive their respective portions (respective OFDM data units 708) transmitted in the OFDMA data unit 706, and transmit respective acknowledgement (ACK or BlkAck) frames 712 to the AP 702. In an embodiment, the client stations 704 transmit the respective acknowledgement frames 712 simultaneously, in respective sub-channels, as parts of an OFDMA transmission 714 to the AP 14. The AP 702 synchronizes transmission of the ACK frames 712 from the client stations 704 by ensuring that the OFDM data units 708-1, 708-2, 708-3 are of equal length, in an embodiment. For example, the AP 702 adds padding bits (e.g., bits having predetermined values such as zero or one) to data bits in one or more of the data units 708 to equalize lengths of the data units 708, in an embodiment. For example, in an embodiment in which the OFDM data units 708-1, 708-2, 708-3 are A-MPDUs, the AP 14 utilizes A-MPDU padding in one or more of the data units 708-1, 708-2, 708-3 to ensure that the data units 708-1, 708-2, 708-3 are of the same length. As another example, in an embodiment in which the OFDM data units 708-1, 708-2, 708-3 are MPDUs, and the AP 702 utilizes MPDU padding in one or more of the data units 708-1, 708-2, 708-3 to ensure that the data units 7081, 708-2, 708-3 are of the same length. As discussed above, the communication device 710 (the AP's neighbor) refrains from transmitting in the medium after the end of the data unit 706 for the duration of EIFS after the end of the data unit 702. In some embodiments and/or scenarios, a transmission time of the acknowledgment frames 712 and two short interframe space (SIFS) durations (e.g., a first SIFS duration after the OFDMA data unit 706 and a second SIFS duration after the OFDMA data unit 714) is longer than this EIFS duration and thus the EIFS protection is insufficient.

Each ACK frame 712 conforms to a legacy control frame format, in an embodiment. For example, each ACK frame 712 conforms to a control frame format defined by the IEEE 802.11a, 802.11n and/or 802.11ac Standards. In an embodiment, each client station 704 transmits its ACK frame 712 using the channel allocated to the client station 704 for receiving the OFDM data unit 708 directed to the client station 704. Thus, for example, STA1 704-1 transmits the ACK frame 712-1 in the first 20 MHz channel allocated to the STA1 704-1 for receiving the OFDM data unit 708-1, STA1 704-1 transmits the ACK frame 712-1 in the second 20 MHz channel allocated to the STA2 704-2 for receiving the OFDM data unit 708-2, and STA3 704-3 transmits the ACK frame 712-3 in the 40 MHz channel allocated to the STA1 704-3 for receiving the OFDM data unit 708-3. In an embodiment, each of the ACK frames 712 occupies the smallest bandwidth channel defined in the network. For example, each ACK frame 712 occupies a 20 MHz bandwidth, in the illustrated embodiment. The ACK frame 712, transmitted in a 40 MHz channel, is duplicated in the lower 20 MHz and the upper 20 MHz portions of the 40 MHz channel, in the illustrated embodiment. In another embodiment, each ACK frame 712 occupies the bandwidth of the entire channel in which the ACK frame is transmitted. For example, the ACK frame 712-3 occupies the entire 40 MHz channel allocated to STA3 704-3, in another embodiment.

In an embodiment, each ACK frame 712 includes a duration field set to indicate a time corresponding to the remaining time of the TXOP, having respective OFDM data units 718 directed to respective client stations 704, and transmission of respective to acknowledgement frames 720 by the client stations 704 in response to receiving their respective OFDM data units 718. In an embodiment, the acknowledgement frames 718 are transmitted by the client statins 704 simultaneously, in respective sub-channels allocated to the client stations 704, as parts of an OFDMA transmission to the AP 702. Communication devices within the communication range of each of the client stations 704 determine, based on the duration indicated by the ACK frames 712, the duration corresponding to transition of the OFDMA data unit 716 and transmission of the acknowledgement frames 720, and set their network allocation vector (NAV) accordingly to refrain from transmission in the medium for the determined duration after the end of the ACK frames 712. For example, a communication device 730 within the communication range of a client station 704 (e.g., STA3 704-3) sets its NAV according to the duration indicated by the legacy signal field of the ACK frame 712 to refrain from transmission in the medium for the duration corresponding to transition of the OFDMA data unit 716 and transmission of the acknowledgement frames 720 after the end of the ACK frame 712, in the illustrated embodiment.

After the AP 702 receives the OFDMA transmission 714, the AP 704 transmits the second OFDMA data unit 716 to the client stations 704. In an embodiment, the AP 704 transmits the OFDMA data unit 716 upon expiration of a predetermined time period, such as a short interframe space (SIFS) after reception of the ACK frames 712. In an embodiment, a combined duration of transmission of the ACK frames 712 and SIFS after reception of the ACK frames 712 is less than the duration of EIFS. Thus, the AP 720 transmits the OFDMA data unit 716 before expiration of the EIFS tinier at the communication device 710. Accordingly, transmission of the OFDMA data unit 716 is protected against collision, for example, due to transmissions by the communication device 710. After receiving the respective OFDM data units 718, client stations 704 transmit the respective ACK frames 720 to the AP 702. Transmission of the ACK frames 720 are protected against collision, for example, due to transmission by the communication device 730 and/or other communication device(s) within the communication range of the client stations 704 because of the NAV the communication device 730 and/or other communication device(s) within the communication range of the client stations 704 based on the ACK frames 712, in an embodiment. In some embodiments and/or scenarios, a transmission time of the acknowledgment frames 720 and two short interframe space (SIFS) durations (e.g., a first SIFS duration after the OFDMA data unit 716 and a second SIFS duration after the OFDMA data unit 718) is longer than this EIFS duration and thus the EIFS protection is insufficient.

Figure 8A:
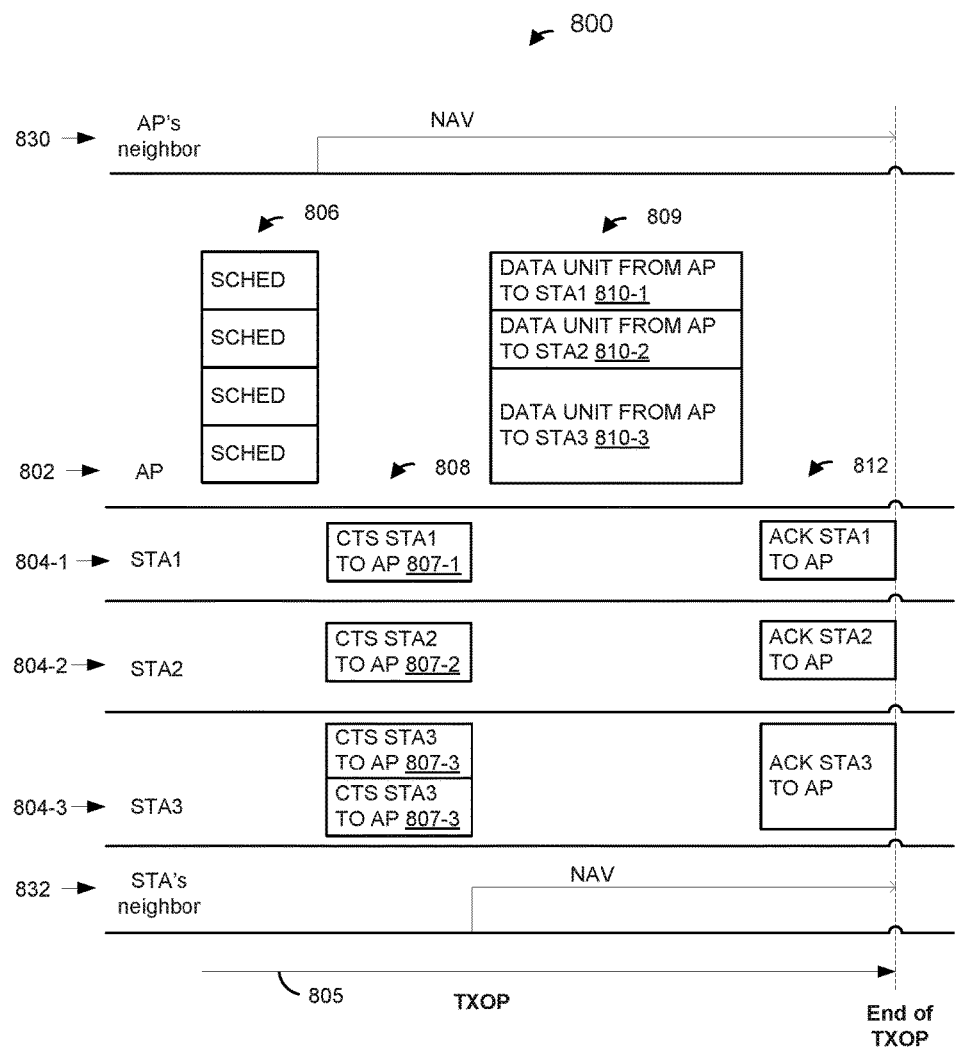
FIG. 8A is a diagram illustrating a frame exchange between an AP and a plurality of client stations, according to another embodiment.

FIG. 8A is diagram illustrating a frame exchange 800 between an AP and a plurality of client stations, according to an embodiment. In particular, an AP 802 utilizes OFDMA communication to communicate with a plurality of client stations 804, including a first client station STA1 804-1, a second client station STA2 804-2, and a third client station STA3 804-3, in the illustrated embodiment. With reference to FIG. 1, in an embodiment, the AP 802 corresponds to the AP 14 and the client stations 804 correspond to different ones of the client stations 25. In an embodiment, respective sub-channels are statically allocated to the plurality of client stations 804 for OFDMA communication with the plurality of the client stations 804. For example, respective 20 MHz sub-channels are allocated to each of the client stations 804-1 and 804-2, and a 40 MHz sub-channel is allocated to the client station 804-3, in the illustrated embodiment. The frame exchange 800 occurs during a transmit opportunity 805 obtained by the AP 802 for OFDMA communication with the client stations 804 or scheduled for OFDMA communication with the client stations 804, in various embodiments.

The AP 802 transmits a control frame 806, such as a scheduling frame, to the plurality of client stations 804, in an embodiment. In an embodiment, the control frame 806 is a legacy control frame that at least substantially conforms to a legacy communication protocol (e.g., the IEEE 802.11a Standard, the IEEE 802.11n Standard, and/or the IEEE 802.11ac Standard). In an embodiment, the AP 802 transmits the control frame 806 at the beginning of the TXOP 805 obtained or scheduled for OFDMA communication between the AP 802 and client stations 804. In an embodiment, the control frame 806 is duplicated in each 20 MHz sub-channel of an OFDM channel obtained or scheduled for OFDMA communication between the AP 802 and the client stations 804 during the TXOP 805. In an embodiment, the control frame 806 includes an indication of a remaining duration of the TXOP 805 after transmission of the control frame 806. For example, in an embodiment, the control frame 806 indicates a length or duration corresponding to total time of transmission of control frames 807 (e.g., clear to send (CTS) frames) by the client stations 804 to the AP 802 in response to receiving the control frame 806, transmission of an OFDMA data unit 809 from the AP 802 to the client stations 804, and transmission of acknowledgement frames (e.g., ACK frames of BlkAck frames) 812 by the client stations 804 to acknowledge receipt of respective OFDM data units 810 transmitted to the client stations 804 as parts of the data unit 809, in an embodiment.

As used herein, "a length or duration corresponding to transmission of a frame" or "a length or duration corresponding to transmission of a data unit" is intended to include duration of transmission of the frame (or data unit) itself as well as duration of an interframe space between transmission of a previous frame (or data unit) and transmission of the frame (or data unit) itself, in at least some situations. For example, as used herein, a duration corresponding to transmission of acknowledgement frames 812 includes duration of transmission of the acknowledgement frames 812 as well as an interframe space (e.g., SIFS) between transmission of the OFDMA data unit 809 and the acknowledgement frames 812, in at least some situations. As used herein, "a length or duration corresponding to total time of transmission of multiple frames," for example, frames 808, 809, and 812, or "a length or duration corresponding to total time of transmission of multiple data units" includes the transmission of all frames (or data units), with a SIFS duration between any two of the frames (or data units).

In an embodiment in which the control frame 806 is a scheduling frame, the control frame 806 identifies the client stations 804 that are intended participants in the TXOP 805 or a subset of intended participants in the TXOP 805, for example by including at least a partial association identifier (AID) corresponding to each of the client stations 804 that are intended participants in the TXOP 805, and includes channel allocation information for downlink OFDMA transmission to the identified client stations 804. For example, the control frame 806 indicates, for each identified client station 804, one or more 20 MHz sub-channels allocated for OFDMA downlink transmission to the client station 804 during the TXOP 805, in an embodiment. In another embodiment, client stations 804 are identified as intended participants in the TXOP 805 prior to the beginning of the TXOP 805 and/or channel allocation information is provided to the participants in the TXOP 805 prior to the beginning of the TXOP 805. For example, in a sub-channel selective transmission technique, the AP 802 signals sub-channel allocation information to the client station 804 for use during scheduled period corresponding to the TXOP 805 prior to the beginning of TXOP, in an embodiment. In such embodiments, the control frame 806 need not include channel allocation information. In some such embodiments, the control frame 806 is a control frame other than a scheduling frame. For example, the control frame 806 is a request to send (RTS) frame, in one such embodiment.

In an embodiment, communication devices in the communication range of the AP 802 (e.g., AP's neighbor) determine the duration indicated by the control frame 806, and set their NAVs accordingly to refrain from transmission in the medium for the determined duration indicated by the control frame 806. Accordingly, the communication devices refrain from transmission in the medium for the remaining duration of the TXOP after the control frame 806, in an embodiment. For example, a communication device 830 in the communication range of the AP 802 sets its NAV according to the duration indicated by control frame 806 to refrain from transmission in the medium for the remaining duration of the TXOP after the control frame 806, in the illustrated embodiment. Thus, transmission of the control frames 807 from the client stations 804 to the AP 802, transmission of the OFDMA data unit 809 from the AP 802 to the client stations 804, and transmission of the acknowledgement frames 812 from the client stations 804 to the AP 802 are protected from transmissions by the communication device 830, in an embodiment.

In an embodiment, the control frame 806 includes a request for transmission of control frames 807 by the client stations 804 in response to receiving the control frame 806. In another embodiment, the control frame 806 include an enhanced request for transmission of control frames 807 by the client stations 804 in response to receiving the control frame 806. In an embodiment, the control frames 807 requested by the control frame 806 to be transmitted in response to receiving the control frame 807 are clear to send (CTS) frames. In another embodiment, the control frames 807 requested by the control frame 806 to be transmitted in response to receiving the control frame 807 are frames other than CTS frames. For example, the control frames 807 requested by the control frame 806 to be transmitted in response to receiving the control frame 806 are quality of service (QoS) frames that do not require an acknowledgement by AP 802, in an embodiment.

In an embodiment, each control frame 807 is a legacy control frame that at least substantially conforms to a legacy communication protocol (e.g., the IEEE 802.11a Standard, the IEEE 802.11n Standard, and/or the IEEE 802.11ac Standard). For example, each control frame 807 is a legacy PPDU that at least substantially conforms to PPDU format defined in the IEEE 802.11a Standard, in the IEEE 802.11n Standard, and/or in the IEEE 802.11ac Standard, in some embodiments. In an embodiment, the client stations 804 transmit the respective control frames 807 as parts of an OFDMA transmission 808 from the client stations 804 to the AP 802. The respective control frames 807 are transmitted in the respective sub-channels allocated to the client stations 804 for OFDMA communication during the TXOP 805, in an embodiment. In an embodiment, if a client station 804 is allocated a sub-channel that is greater than the smallest communication channel of the WLAN transmits a duplicate control frame 807 that duplicates the control frame 807 in each smallest WLAN channel within the sub-channel allocated to the client station 804. Thus, for example, the client station 804-3 transmits a control frame 807 in each 20 MHz channel of the 40 MHz sub-channel allocated to the client station 804-3, in the illustrated embodiment. Each control frame 807 includes an indication of a remaining duration of the TXOP 805 after the end of the control frame 807, in an embodiment. For example, each control frame 807 indicates a duration corresponding to transmission of the OFDMA data unit 809 from the AP 802 to the client stations 804 and transmission of the acknowledgement frames (e.g., ACK frames or BlkAck frames) 812 from the client stations 804 to the AP 802, in an embodiment.

In an embodiment, communication devices within the communication range of the client stations 804 (e.g., STA's neighbor) determine TXOP duration based on the indication included in the control frame 807, and set their NAVs accordingly to refrain from transmission in the medium for the determined duration after the end of the control frame 807. For example, a communication device 832 within the communication range of the client station 804-3 sets its NAV according to the duration indicated by control frame 807 to refrain from transmission in the medium for the remaining duration of the TXOP 805 after the end of the control frame 807, in the illustrated embodiment. The AP 802 transmits the OFDMA data unit 809 to the client stations 804. The OFDMA data unit 809 includes respective OFDM data units 810 transmitted to the client stations 804 in respective sub-channels allocated to the client stations 804, in an embodiment. In response to receiving the respective OFDM data units 810, the client stations 804 transmit acknowledgement frames 812 to the AP 802 to acknowledge receipt of the data units 810. The acknowledgment frames 812 are transmitted by the client station 804 simultaneously, in the respective sub-channels allocated to the client stations 804 (i.e., the respective channels via which the client stations 804 received the respective data units 810), as parts of an OFDMA transmission from the client stations 804 to the AP 802, in an embodiment. Because communication devices in the communication range of the client stations 804 refrain from transmission in the medium for the duration indicated by the control frames 807, the reception of the OFDM data units 810 by the client stations 804 and transmission of acknowledgement frames 812 by the client stations 804 are protected from transmissions by the communication devices in the communication range of the client stations 804, in an embodiment.

Figure 8B:
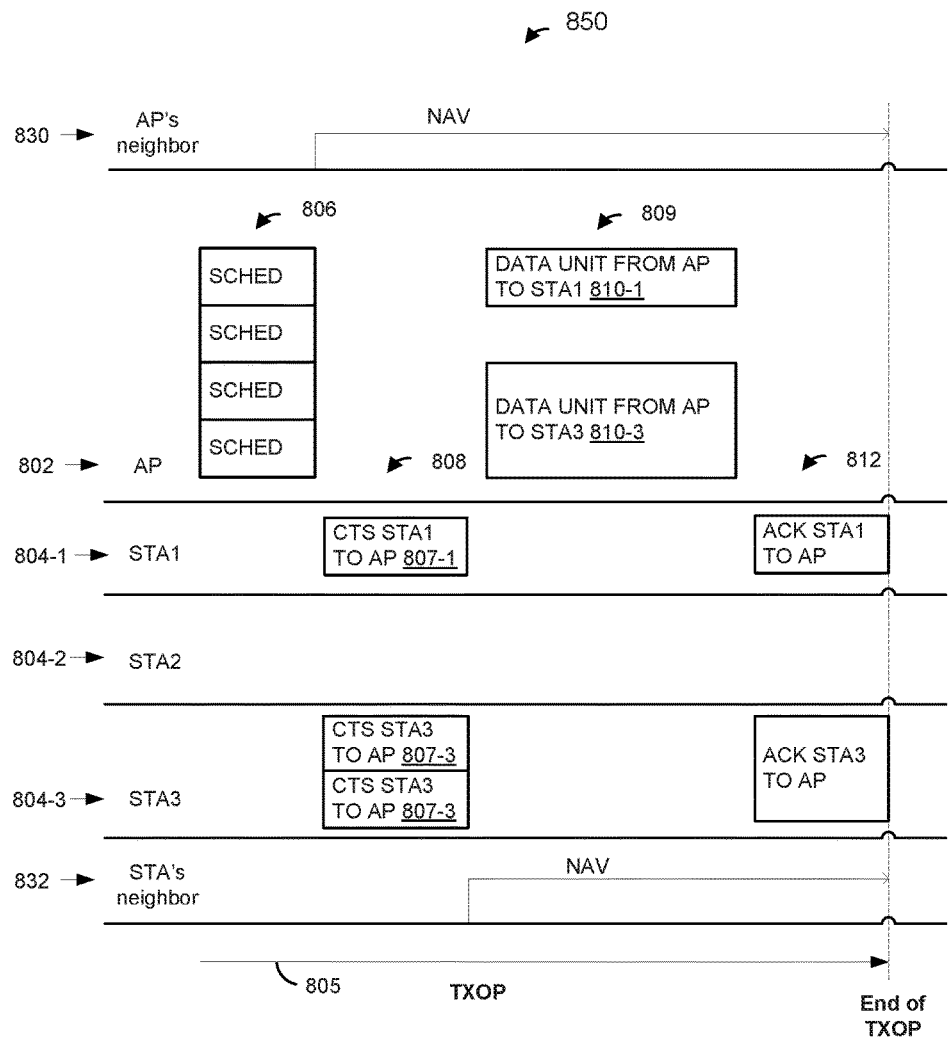
FIG. 8B is a diagram illustrating a frame exchange between an AP and a plurality of client stations, according to another embodiment.

FIG. 8B is diagram illustrating a frame exchange 850 between an AP and a plurality of client stations, according to an embodiment. The frame exchange 850 is generally the same as the frame exchange 800 of FIG. 8A except that in the frame exchange 850, not all of the client stations 804 transmit respective control frames 807 in response to receiving the control frame 806. For example, the client station 804-2 detects that the sub-channel allocated to the client station 806 is not available for transmission, in an embodiment. Accordingly, the client station 804-2 does not transmit the control frame 807 requested by the control frame 806 in response to receiving the control frame 806, in an embodiment. Because the AP 802 does not receive the control frame 807 from the client station 802, the AP 802 does not transmit an OFDM data unit directed to the client station 804-2 as part of the OFDMA transmission 809, in an embodiment.

Figure 9A:
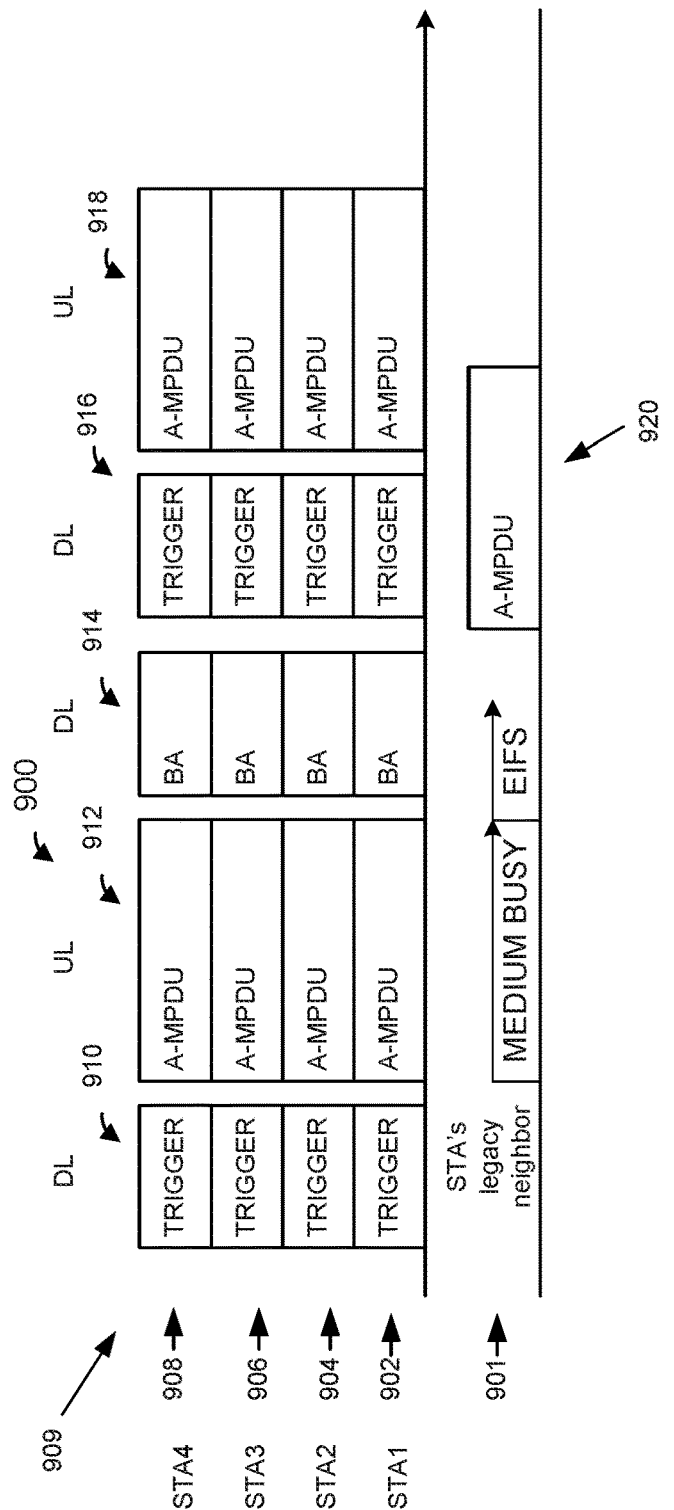
FIG. 9A is a diagram illustrating a frame exchange between an AP and a plurality of client stations, according to another embodiment.

FIG. 9A is a diagram illustrating a frame exchange 900 between an AP (not shown) and a plurality of client stations (not shown), according to another embodiment. The frame exchange 900 includes downlink (DL) duplicated legacy data units 910, DL OFDMA data unit 914, and DL duplicated legacy data unit 916, which are transmitted by the AP to multiple client stations STA1, STA2, STA3, and STA4, and also includes uplink (UL) OFDMA data units 912 and 918, which are transmitted by the multiple client stations to the AP in response to the downlink OFDMA data units 910 and 916, in an embodiment. With reference to FIG. 1, in an embodiment, the AP 14 transmits the downlink data units 910, 914, and 916 and different ones of the client stations 25 transmit at least a portion of the uplink OFDMA data units 912 and 918. The OFDMA data units 912, 914, and 918 are transmitted in a manner similar to the transmission of the OFDMA data units 706, 714, 716, and 718 described above with respect to FIG. 7, in an embodiment.

The data units 910, 912, 914, 916, and 918 are transmitted via OFDM sub-channels 902, 904, 906, and 908 of an OFDM channel 909. In an embodiment, the OFDM channel 909 spans 80 MHz and each sub-channel 902, 904, 906, and 908 spans a 20 MHz portion. In other embodiments, the OFDM channel 909 spans 20 MHz, 40 MHz, 160 MHz, 320 MHz, or another suitable bandwidth. In other embodiments, the OFDM sub-channels 902, 904, 906, and 908 span a differently sized portion, for example, 10 MHz, 40 MHz, 80 MHz, or other suitable portion of the OFDM channel 909. In an embodiment, the sub-channels 902, 904, 906, and 908 are statically allocated to the plurality of client stations 25 for OFDMA communication. For example, the 20 MHz sub-channels 902, 904, 906, and 908 are allocated to each of the client stations STA1, STA2, STA3, and STA4, respectively.

In an embodiment, the AP 14 transmits a control frame 910 to the client stations STA1, STA2, STA3, and STA4 via the corresponding 20 MHz OFDM sub-channel. In another embodiment, the AP 14 transmits a control frame 910 to the client stations STA1, STA2, STA3, and STA4 via duplicated legacy PPDUs only duplicated in 20 MHz channels. The control frame 910 is generally similar to the control frame 806 of FIG. 8A. For example, the control frame 910 is a scheduling frame, (broadcast) trigger frame, or (broadcast) SYNC frame that identifies the client stations STA1, STA2, STA3, and STA4 and includes channel allocation information for the OFDMA communication with the client stations STA1, STA2, STA3, and STA4, in an embodiment. In response to the control frame 910, the client stations STA1, STA2, STA3, and STA4 transmit the uplink OFDMA data unit 912, in an embodiment. In the illustrated embodiment, the uplink OFDMA data unit 912 includes a respective OFDM data unit (e.g., an A-MPDU) from each of the client stations STA1, STA2, STA3, and STA4 to the AP 14, for example, via the corresponding OFDM sub-channels 902, 904, 906, and 908. In response to the OFDMA data unit 912, the AP 14 transmits a suitable acknowledgment (e.g., Ack or Block Ack) within the downlink OFDMA data unit 914, via the corresponding OFDM sub-channels 902, 904, 906, and 908. In an embodiment, the AP 14 transmits another control frame 916 to trigger the OFDMA data unit 918. The control frame 916 is generally similar to the control frame 910 and the OFDMA data unit 918 is generally similar to the OFDMA data unit 912. In an embodiment, the DL sub-channel and UL sub-channel allocated to a particular client station are different.

In the illustrated embodiment of FIG. 9A, a legacy client station 901 is located in the vicinity of the client stations STA1, STA2, STA3, and STA4 but is located further from the AP 14 so that the legacy client station 901 can suitably determine when the OFDM channel 909 is busy based on transmissions by the client stations STA1, STA2, STA3, and STA4 but cannot suitably determine when the OFDM channel 909 is busy based on transmission from the AP 14. In other words, the AP 14 is a hidden node to the legacy client station 901. As shown in FIG. 9A, the legacy client station 901 determines that the OFDM channel 909 is busy during transmission of the uplink OFDMA data unit 912, after which the legacy client station 901 waits for an EIFS duration before attempting to utilize the OFDM channel 909. In one scenario, the legacy client station 901 cannot suitably determine that the OFDM channel 909 is busy during the transmission of the downlink OFDMA data units 914 and 916. In this scenario, the legacy client station 901 transmits an OFDM data unit 920 using the OFDM channel 909, which causes a collision with the downlink OFDMA data units 914 and 916. In this scenario, the protection provided by the EIFS duration is not sufficient to prevent the collision. For example, the legacy client station 901 cannot decode a NAV duration based on the OFDMA data unit 912 because it does not support an OFDMA protocol and cannot determine a NAV duration based on the OFDMA data unit 910 because the AP 14 is a hidden node.

Figure 9B:
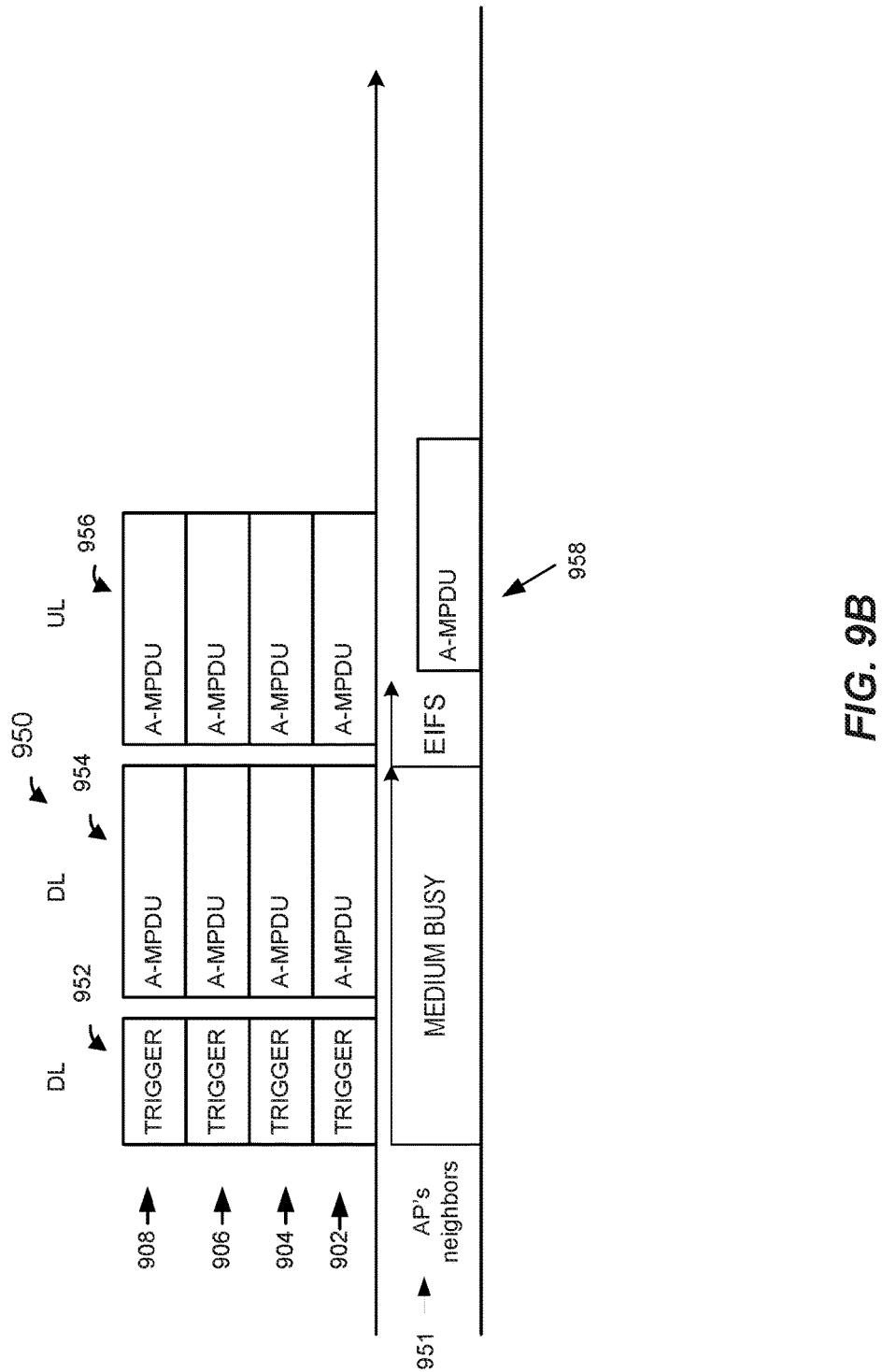
FIG. 9B is a diagram illustrating a frame exchange between an AP and a plurality of client stations, according to another embodiment.

FIG. 9B is a diagram illustrating a frame exchange 950 between the AP 14 and the plurality of client stations STA1, STA2, STA3, and STA4, according to another embodiment. The frame exchange 950 includes downlink (DL) duplicated legacy data unit 952 and OFDMA data unit 954, which are transmitted by the AP to multiple client stations STA1, STA2, STA3, and STA4, and also includes uplink (UL) OFDMA data unit 956, which is transmitted by the multiple client stations to the AP, in an embodiment. With reference to FIG. 1, in an embodiment, the AP 14 transmits the downlink data units 952 and 954 and different ones of the client stations 25 transmit at least a portion of the uplink OFDMA data unit 956. The data units 952, 954, and 956 are transmitted via the OFDM sub-channels 902, 904, 906, and 908 of the OFDM channel 909 in a manner similar to the transmission of the OFDMA data units 910, 912, 914, 916, and 918, as described above with respect to FIG. 9A, in an embodiment.

The AP 14 transmits the downlink data unit 952, for example, single user high efficiency physical layer convergence protocol (PLOP) protocol data units (SU HE PPDUs), to the client stations STA1, STA2, STA3, and STA4, in an embodiment. The SU HE PPDU data units 952 include broadcast trigger frames that have schedule information for STA1, STA2, STA3 and STA4 transmitted to the client stations STA1, STA2, STA3, and STA4, in an embodiment. The trigger frame of the SU HE data unit 952 identify the client stations STA1, STA2, STA3, and STA4 and the corresponding OFDM sub-channels for downlink OFDMA data unit 954 and uplink OFDMA data unit 956, in an embodiment. The AP 14 transmits the OFDMA data unit 954 to the client stations STA1, STA2, STA3, and STA4, in an embodiment. The OFDMA data unit 954 includes respective OFDM data units that include A-MPDUs transmitted to the client stations STA1, STA2, STA3, and STA4, in an embodiment. The client stations STA1, STA2, STA3, and STA4 transmit respective A-MPDUs as portions of the OFDMA data unit 956 from the client stations to the AP 14, in an embodiment.

In the illustrated embodiment of FIG. 9B, a legacy client station 951 is located in the vicinity of the AP 14 but is located further from the client stations STA1, STA2, STA3, and STA4 so that the legacy client station 951 can suitably determine when the OFDM channel 909 is busy based on transmissions by the AP 14 but cannot suitably determine when the OFDM channel 909 is busy based on transmission from the client stations STA1, STA2, STA3, and STA4. In other words, the client stations STA1, STA2, STA3, and STA4 are hidden nodes to the legacy client station 951. As shown in FIG. 9B, the legacy client station 951 determines that the OFDM channel 909 is busy during transmission of the downlink OFDMA data units 952 and 954, after which the legacy client station 951 waits for an EIFS duration before attempting to utilize the OFDM channel 909. In one scenario, the legacy client station 951 cannot suitably determine that the OFDM channel 909 is busy during the transmission of the uplink OFDMA data unit 956. In this scenario, the legacy client station 951 transmits an OFDM data unit 958 using the OFDM channel 909, which causes a collision with the uplink OFDMA data unit 956. In this scenario, the protection provided by the EIFS duration is not sufficient to prevent the collision. For example, the legacy client station 951 cannot determine a NAV duration based on the OFDMA data unit 956 because the client stations STA1, STA2, STA3, and STA4 are hidden nodes.

Referring back to FIG. 1, in an embodiment and/or scenario, the AP 14 and the client stations 25 employ static bandwidth allocation for OFDMA transmission to and/or from client stations 25. In another embodiment and/or scenario, the AP 14 and one or more of the client stations 25 conduct dynamic bandwidth negation for OFDMA transmission to and/or from the one or more of the client stations 25. For example, when static bandwidth allocation is used for a client station 25, and only a portion of the allocated bandwidth is available for transmission to or from the client station 25, the transmission in the wider allocated bandwidth sub-channel to or from the client station 25 does not occur, in an embodiment. On the other hand, when dynamic bandwidth negotiation is used for a client station 25, and only a portion of the allocated bandwidth is available for transmission to or from the client station 25, transmission to or from the client station 25 can occur in a sub-channel corresponding the available bandwidth.

Figure 10:
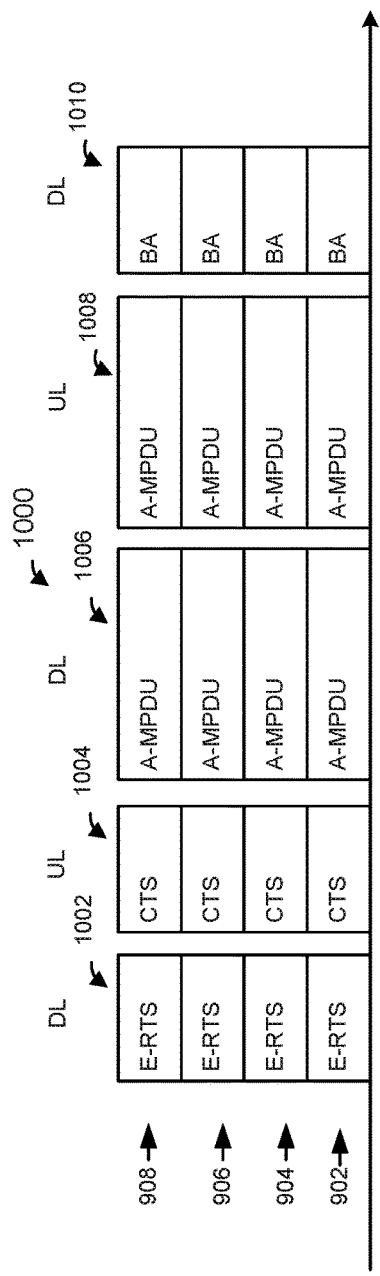
FIG. 10 is a diagram illustrating a frame exchange between an AP and a plurality of client stations, according to another embodiment.

FIG. 10 is a diagram illustrating a frame exchange 1000 between an AP (not shown) and a plurality of client stations (not shown), according to another embodiment. The frame exchange 1000 includes downlink duplicated legacy data units 1002 which includes broadcast frames, to multiple client stations STA1, STA2, STA3, and STA4, followed by uplink (UL) duplicated legacy PPDU data units 1004. In another embodiment, the data unit 1002 is an HE/very high throughput (VHT) SU PPDU. In one embodiment, the broadcast control frame in legacy duplicated data units 1002 carries the information for multiple stations STA1, STA2, STA3, and STA4 to transmit a CTS. In one embodiment, the Duration field in the broadcast control frame in duplicated legacy data units 1002 carries Duration which indicates the remaining TXOP. Accordingly, the neighbors of the AP can set NAV until the end of TXOP. In one embodiment, the Duration field in the responding control frame in duplicated legacy data units 1004 carries Duration which indicates the remaining TXOP. Accordingly, the neighbors of the client stations can set NAV until the end of the TXOP. The legacy PPDU exchange is used to protect the following OFDMA frame exchange. In the remaining TXOP, the following frame exchanges include DL OFDMA PPDU 1006 and 1010 which are transmitted by the AP to multiple stations STA1, STA2, STA3, and STA4, and UL OFDMA data units 1008, which are transmitted by the multiple client stations to the AP, in an embodiment. With reference to FIG. 1, in an embodiment, the AP 14 transmits the downlink OFDMA data units 1006, and 1010 and different ones of the client stations 25 transmit at least a portion of the uplink OFDMA data units 1008. The OFDMA data units 1004, 1006, 1008, and 1010 are transmitted via the OFDM sub-channels 902, 904, 906, and 908 of the OFDM channel 909 in a manner similar to the transmission of the OFDMA data units 910, 912, 914, 916, and 918, as described above with respect to FIG. 9A, in an embodiment.

In the embodiment shown in FIG. 10, the DL legacy duplicated data unit 1002 includes a first control frame that is duplicated across each of the MHz channels 902, 904, 906, and 908. In various embodiments, the first control frame of the DL legacy duplicated data unit 1002 is an RTS frame, an enhanced RTS frame, or other suitable frame that provides an indication requesting simultaneous control frame transmissions from the plurality of client stations for duplicated legacy communication. In other words, the first control frame polls the client stations or otherwise indicates that the plurality of client stations STA1, STA2, STA3, and STA4 are requested to simultaneously transmit respective control frames to the AP 14 as the duplicated legacy data unit 1004. In some embodiments, the first control frame indicates the plurality of client stations which transmit their respective control frame of the duplicated legacy data unit 1004. In an embodiment, the first control frame of the duplicated legacy data unit 1002 is the enhanced RTS frame that has a frame length that is less than a frame length of an trigger frame of the duplicated legacy data unit. In another embodiment, the first control frame of the duplicated legacy data unit 1002 is a trigger frame where unused fields in the trigger frame are reserved.

In response to the first control frame of the DL duplicated legacy data unit 1002, each of the client stations indicated by the DL duplicated legacy data unit 1002 determines whether the entire channel of the plurality of 20 MHz channels are available and provides a second control frame to the AP 14 if the entire channel are available, in an embodiment. For example, each of the plurality of client stations performs a CSMA/CA procedure to determine whether all the 20 MHz channels 902, 904, 906, and 908 are available to the respective client station. In an embodiment, in response to determining that all 20 MHz channels are available to the client station, the client station provides the respective second control frames to the AP 14 across the entire channel via the duplicated legacy data unit 1004. In another embodiment, in response to determining that each of the plurality of 20 MHz channels is available to the client station, the client station provides the second control frame to the AP but, in response to determining that any of the plurality of 20 MHz channels is unavailable to the client station, the client station omits providing the second control frame to the AP. In yet another embodiment, in response to determining that at least some of the MHz channels are available to the client station and at least some of the 20 MHz channels are unavailable to the client station, the client station provides the second control frame to the AP via the sub-channels that are available to the client station and omits the second control frame from the sub-channels that are unavailable to the client station. In one embodiment, the sub-channel used by a client station is defined by the first control frame.

In some embodiments, each of the client stations duplicates their respective second control frame across the 20

MHz channels used by the first control frame in duplicated legacy data units. In the embodiment shown in FIG. 10, for example, the client station STA1 determines that each of the MHz channels 902, 904, 906, and 908 is available for transmission to or from the client station STA1 and, in response, transmits the second control frame duplicated across each of the MHz channels 902, 904, 906, and 908. In a similar manner, the client station STA2 determines that each of the MHz channels 902, 904, 906, and 908 is available for transmission and transmits a respective second control frame duplicated across each of the MHz channels 902, 904, 906, and 908. In this way, the second control frames from the client station STA1 and client station STA2 are simultaneously transmitted via the same MHz channels and thus overlap with each other. In an embodiment, the client station STA3 deter mines that the MHz channels 906 and 908 are available to the client station STA3 but the 20 MHz channels 902 and 904 are unavailable to the client station STA3, and in response, the client station STA3 omits providing any of the second control frames to the AP 14.

The respective second control frames from the client stations are scrambled using a same scramble seed, in various embodiments. Using the same scramble seed allows the AP 14 to suitably decode the second control frames without interference from each other in that each of the second control frames has same content and is also scrambled in the same way. In an embodiment, the client stations identify the scramble seed of the first control frame and use the identified scramble seed when scrambling the respective second control frames. In another embodiment, the client stations use a pre-identified value for the scramble seed, such as a value defined by the HEW protocol. In yet another embodiment, the client stations use a predetermined function with a same initial value to generate the scramble seed, for example, a random number generator with a particular seed value.

The respective second control frames of the OFDMA data unit 1004 are encoded by the client stations using a same data rate, in various embodiments. Using the same data rate allows the AP 14 to suitably decode the second control frames without interference from each other in that each of the second control frames has a generally same duration, same OFDM symbol content and OFDM symbol alignment (e.g., a same number of OFDM symbols and a same symbol spacing). In an embodiment, the data rate is a primary data rate determined based on the data rate of the first control frame (e.g., using the same data rate as used by the first control frame). In yet another embodiment, the HEW protocol identifies an alternate data rate per the primary data rate determined by the data rate of the first control frame. In another embodiment, the first control frame carries the data rate for the transmission of the second control frame.

In response to the UL duplicated legacy data unit 1004, the AP 14 transmits the DL OFDMA data unit 1006 to the client stations, in an embodiment. In an embodiment, the DL OFDMA data unit 1006 includes an OFDM data unit for each of the client stations STA1, STA2, STA3, and STA4. In another embodiment, the DL OFDMA data unit 1006 includes respective OFDM data units that include A-MPDUs transmitted to the client stations STA1, STA2, STA3, and STA4, in an embodiment. In one embodiment, the DL OFDMA data unit uses sub-channels which are different from 20 MHz channels. In another embodiment, the DL OFDMA data unit uses 20 MHz channel as sub-channel. The client stations STA1, STA2, STA3, and STA4 transmit respective A-MPDUs as portions of the OFDMA data unit 1008 from the client stations to the AP 14, in an embodiment. In an embodiment, the A-MPDUs of the UL OFDMA data unit 1008 include suitable acknowledgment frames in response to the corresponding A-MPDU of the DL OFDMA data unit 1006. The AP 14 transmits a suitable acknowledgment (e.g., Ack or Block Ack) within the downlink OFDMA data unit 1010, via the corresponding OFDM sub-channels 902, 904, 906, and 908. In one embodiment, OFDM sub-channels 902, 904, 906, and 908 are 20 MHz channels. In another embodiment, OFDM sub-channels 902, 904, 906, and 908 have a bandwidth different from 20 MHz channels, for example, 2 MHz, 5 MHz, 10 MHz, 40 MHz, or another suitable bandwidth.

Figure 11:
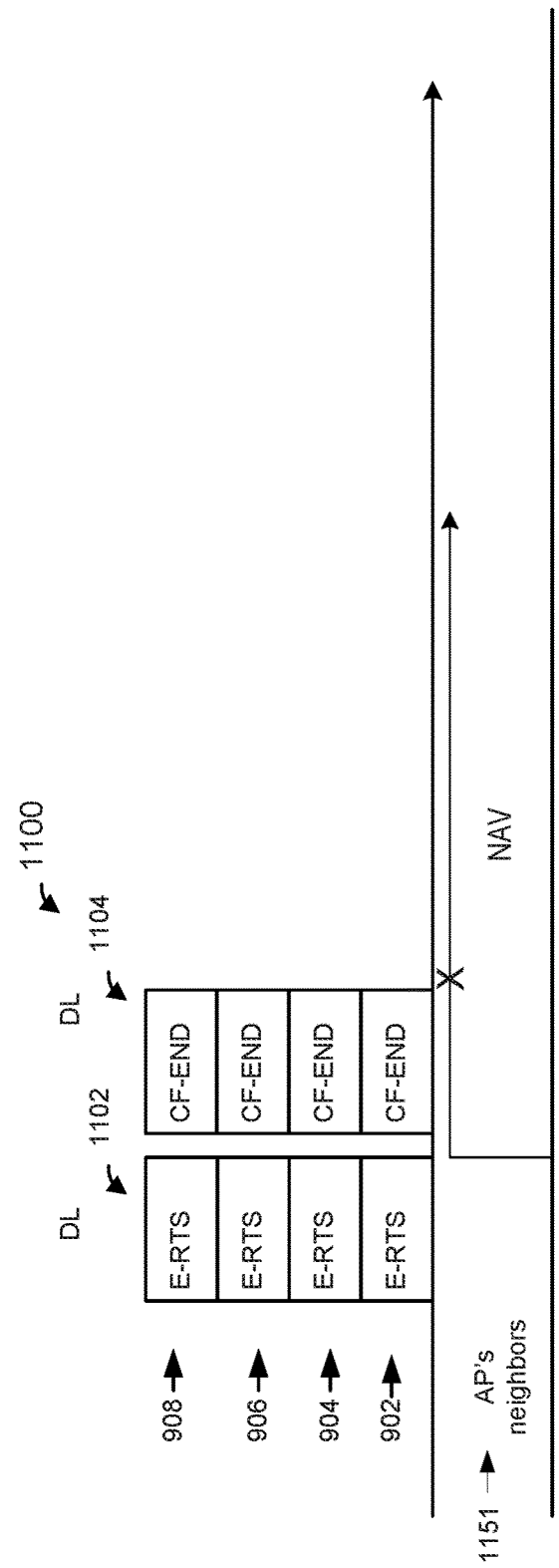
FIG. 11 is a diagram illustrating a frame exchange between an AP and a plurality of client stations, according to another embodiment.

FIG. 11 is a diagram illustrating a frame exchange 1100 between an AP (not shown) and a plurality of client stations (not shown), according to another embodiment. The frame exchange 1100 includes downlink (DL) duplicated legacy data units 1102 and 1104, which are transmitted by the AP to multiple client stations STA1, STA2, STA3, and STA4. With reference to FIG. 1, in an embodiment, the AP 14 transmits the downlink duplicated legacy data units 1102 and 1104. The OFDMA data units 1102 and 1104 are transmitted via the 20 MHz channels 902, 904, 906, and 908.

In the embodiment shown in FIG. 11, the AP 14 transmits the DL duplicated legacy data unit 1102, which is generally similar to the duplicated legacy data unit 1002. In an embodiment, communication devices in the communication range of the AP 14 use a duration indicated by the control frames of the duplicated legacy data unit 1102 to set its NAV so as to refrain from transmission in the 20 MHz channels 902, 904, 906, and 908 for the duration indicated by the control frames. For example, a communication device 1151 in the communication range of the AP 14 sets its NAV according to the duration indicated by control frame transmitted by the AP 14, and refrains from transmission for the duration (i.e., until the end of the TXOP). Thus, transmission of OFDMA data units between the AP 14 and client stations STA1, STA2, STA3, and STA4 are protected from transmissions by the communication device 1151, in an embodiment.

In some embodiments and/or scenarios, the communication device 1151 supports the HEW protocol. In one such embodiment, the communication device 1151 resets its NAV after the E-RTS frame if a CTS frame is not received within a suitable timeout period of the HEW protocol (e.g., a CTS timeout). In another embodiment, the communication device 1151 does not support the HEW protocol and is unable to reset its NAV based on the CTS timeout. In an embodiment, the AP 14 transmits a control frame that indicates to the communication device 1151 to reset its NAV so that the communication device 1151 can contend for use of the unused 20 MHz channels 902, 904, 906, and 908. For example, the AP 14 transmits a contention free end (CF-end) control frame 1104 in the 20 MHz channels 902, 904, 906, and 908 after a suitable time period without receipt of a CTS frame. In an embodiment, the AP 14 determines whether the 20 MHz channels 902, 904, 906, and 908 are idle or available after a point coordination function (PCF) interframe space (PIES) duration and, in response to the idle determination, transmits the duplicated legacy CF-end control frame.

Figure 12:
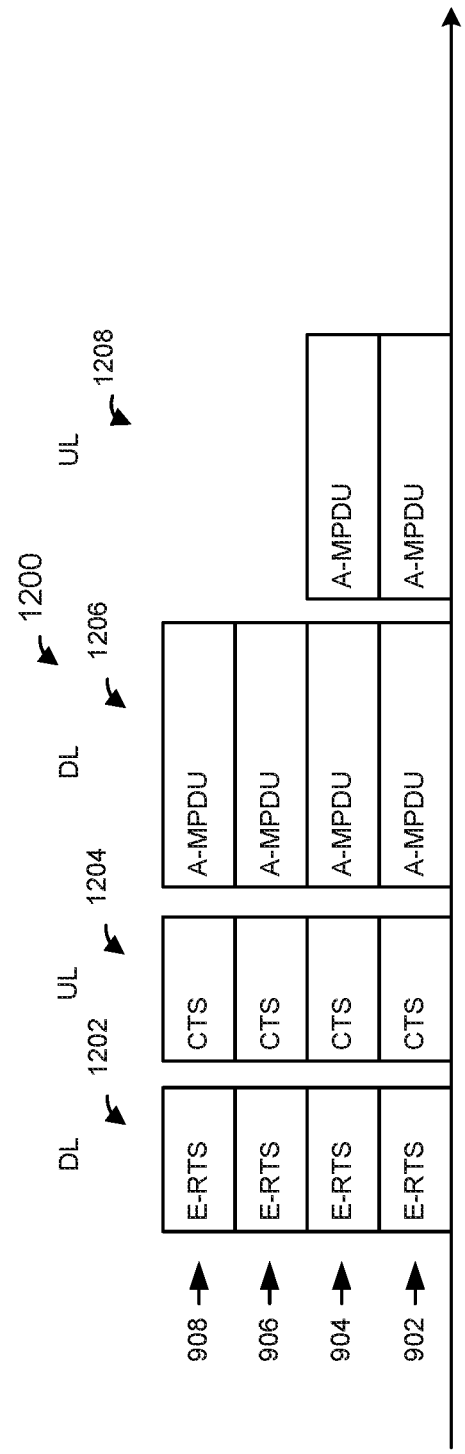
FIG. 12 is a diagram illustrating a frame exchange between an AP and a plurality of client stations, according to another embodiment.

FIG. 12 is a diagram illustrating a frame exchange 1200 between an AP (not shown) and a plurality of client stations (not shown), according to another embodiment. The frame exchange 1200 includes: 1) downlink (DL) duplicated legacy data unit 1202, which are transmitted by the AP to multiple client stations STA1, STA2, STA3, and STA4, and uplink (UL) duplicated legacy data unit 1204, which are transmitted by the multiple client stations to the AP; and 2)

OFDMA data units 1206, which are transmitted by the AP to multiple client stations STA1, STA2, STA3, and STA4, and also includes uplink (UL) OFDMA data units 1208, which are transmitted by the multiple client stations to the AP, in an embodiment. In an embodiment, some stations, e.g. STA3 and STA4 detect busy 20 MHz channels and don't transmit (e.g., omit) the second control frames. In an embodiment, the AP 14 can't figure out whether all the stations respond with the second Control frames. With reference to FIG. 1, in an embodiment, the AP 14 transmits the downlink OFDMA data units 1206 to all STAs, e.g. STA1, STA2, STA3, and STA4, and allocate UL sub-channels for STA1, STA2, STA3, and STA4. In one embodiment, only STAs that detect idle 20 MHz channels, e.g. STA1 and STA2 transmit the uplink OFDMA data units 1208 in part of UL sub-channels. In this embodiment, the medium is less efficiently utilized.

As described above with respect to FIG. 10, the client stations respond with duplicated second control frames (CTS frames) when 20 MHz channels are available for transmission, in some embodiments. In an embodiment, the AP receives the duplicated second control frames from only a subset of the plurality of client stations, however, the duplicated second control frames from responding client stations prevent a detection of which client stations have not responded (e.g., masking an omission of the second control frame). In the embodiment shown in FIG. 12, the data units 1202, 1204, 1206, and 1208 are similar to the data units 1002, 1004, 1006, and 1008 of the frame exchange 1000, except that in the frame exchange 1200, the client station STA3 and the client station STA4 do not provide respective second control frames in the UL duplicated legacy data unit 1204; for example, due to an unavailable 20 MHz channels. In this embodiment, the client station STA1 and the client station STA2 provide to the AP 14 respective second control frames that are duplicated across each of the 20 MHz channels 902, 904, 906, and 908 of the OFDM channel 909 during the UL OFDMA data unit 1204. In this embodiment, the second control frames from the client station STA1 and the client station STA2 overlap with each other and also mask the omission of the second control frame by the client station STA3 and the client station STA4. In this embodiment, the AP 14 cannot readily determine that the client station STA3 and the client STA4 have not responded with the second control frame and, in response, includes A-MPDUs directed to the client station STA3 and the client station STA4 in the DL OFDMA data unit 1206. In some embodiments, the AP 14 polls the client stations to determine which of the plurality of client stations responded with the second control frame and their respective idle channels, for example, by additional frames (not shown) transmitted after a short interframe space (SITS) duration from the second control frame.

In the embodiment shown in FIG. 12, the client station STA3 and the client station STA4 do not suitably receive or decode the corresponding A-MPDUs of the DL OFDMA data unit 1206 and thus do not provide a response to the A-MPDUs of the DL OFDMA data unit 1206, as shown by the unused OFDM sub-channels 906 and 908 during the UL OFDMA data unit 1208. In this embodiment, efficiency of the OFDM channel 909 is reduced due to failed transmission of data units to and from the client station STA3 and the client station STA4 during the OFDMA data unit 1206 and 1208.

In various embodiments and/or scenarios, the second control frames (e.g., control frames of UL duplicated legacy data unit 1004 or 1204) transmitted by the client stations 25 are enhanced clear to send (E-CTS) frames. In an embodiment, the second control frame is transmitted through UL OFDMA data unit instead of UL, duplicated legacy data unit, and the OFDM sub-channel allocated to the client station for the second control frame is also used for a subsequent OFDMA data transmission. In this embodiment, the OFDM sub-channel is determined before bandwidth negotiation. In another embodiment, the OFDM sub-channel allocated to the client station for the second control frame is used for the client station to report its idle bandwidth (e.g., which of the plurality of OFDM sub-channels are available to it). In other words, the client stations transmit the OFDMA data unit to perform bandwidth negotiation with the AP 14. In this embodiment, the OFDM sub-channel for a subsequent data transmission is determined after the bandwidth negotiation. In some embodiments, the E-CTS frames include an indication of the available OFDM sub-channels. In one embodiment, the available OFDMA sub-channels are 20 MHz channels, and an 8-bit bitmap in an HE A-Control field is used to indicate the available OFDMA sub-channels. In another embodiment, additional channel state information is carried in HE A-Control field, e.g. 20 MHz channel interference state. In one embodiment, the AP allocates multiple sub-channels to one station where different sub-channels are in different 20 MHz channels. In one embodiment, one station selects one of the multiple sub-channels allocation which is idle to the station to report its available OFDMA sub-channels.

In one embodiment, the second control frames (e.g., control frames of UL OFDMA data unit 1004 or 1204) transmitted by the client stations 25 are OFDMA CTS frames. In other embodiments and/or scenarios, the second control frames (e.g., control frames of duplicated legacy data unit 1004 or 1204) transmitted by the client stations 25 are duplicate 20 MHz CTS frames. In an embodiment, the client stations transmit the duplicate 20 MHz CTS frames across each 20 MHz sub-channel of the OFDM channel 909 which means that in a 20 MHz channel, multiple stations transmit the second control frames. In this embodiment, each of the duplicate 20 MHz CTS frames must have the same content, same scramble seed, and data rate so that the AP 14 can decode the frames due to overlap of the frames, as described above. In an embodiment, the duplicated legacy 20 MHz CTS frames provide suitable transmission opportunity (TXOP) protection from transmissions by legacy client stations. In an embodiment, the AP 14 and client stations 25 utilize both 20 MHz CTS frames and OFDMA data units to provide both bandwidth negotiation and TXOP protection.

Figure 13:
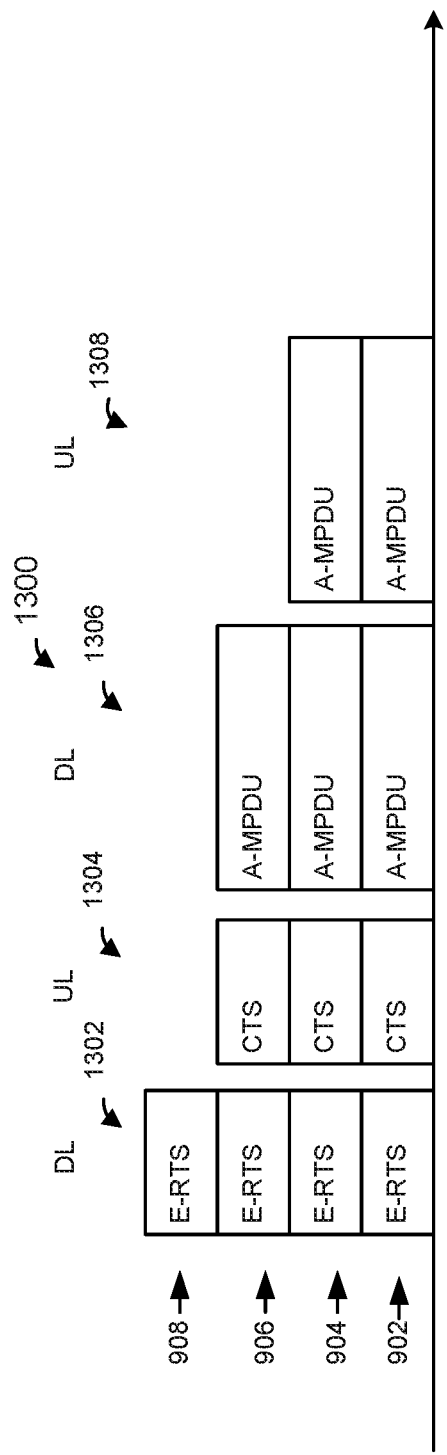
FIG. 13 is a diagram illustrating a frame exchange between an AP and a plurality of client stations, according to another embodiment.

FIG. 13 is a diagram illustrating a frame exchange 1300 between an AP (not shown) and a plurality of client stations (not shown), according to another embodiment. The frame exchange 1300 includes downlink (DL) duplicated legacy data units 1302, which are transmitted by the AP to multiple client stations STA1, STA2, STA3, and STA4, and also includes uplink (UL) duplicated legacy data units 1304, which are transmitted by the multiple client stations to the AP, in an embodiment. The frame exchange 1300 also includes downlink (DL) OFDMA data units 1306, which are transmitted by the AP to multiple client stations STA1, STA2, STA3, and STA4, and also includes uplink (UL) OFDMA data units 1308, which are transmitted by the multiple client stations to the AP, in an embodiment. With reference to FIG. 1, in an embodiment, the AP 14 transmits the downlink data units 1302 and 1306, and different ones of the client stations 25 transmit at least a portion of the uplink data units 1304 and 1308. The data units 1302, 1304, 1306, and 1308 are transmitted via the OFDM sub-channels 902, 904, 906, and 908 of the OFDM channel 909 in a manner similar to the transmission of the OFDMA data units 910, 912, 914, 916, and 918, as described above with respect to FIG. 9A, in an embodiment.

The client stations 25 respond to the first control frame with duplicate second control frames in available or idle OFDM sub-channels of the OFDM channel 909, including when at least some of the OFDM sub-channels are unavailable, in some embodiments. In an embodiment, the client stations respond to the first control frame using only OFDM sub-channels that are both idle and contiguous with each other which is similar to dynamic bandwidth negotiation as described in IEEE 802.11ac. In other words, where only OFDM sub-channels 902, 904, and 908 are idle, the client station responds using OFDM sub-channels 902 and 904 and omits a response using OFDM sub-channels 906 and 908. In an embodiment, the AP 14 has the capability to decode each 20 MHz data unit of the UL duplicated legacy data unit 1304 separately.

In the embodiment shown in FIG. 13, the data units 1302, 1304, 1306, and 1308 are similar to the data units 1002, 1004, 1006, and 1008 of the frame exchange 1000, except that in the frame exchange 1300, the client station STA3 and the client station STA4 do not provide respective second control frames in the UL duplicated legacy data unit 1304, for example, due to an unavailable 20 MHz channels, and the client stations STA1 and STA2 provide to the AP 14 respective second control frames that are duplicated across available 20 MHz channels. In other words, the client stations transmit a duplicated CTS frame across available 20 MHz channels when a portion of the 20 MHz channels are unavailable. In this embodiment, the client station STA1 and the client station STA2 determine that 20 MHz channel 908 is unavailable and thus provide to the AP 14 respective second control frames that are duplicated across the 20 MHz channels 902, 904, and 906 of the OFDM channel 909 during the UL OFDMA data unit 1304. In this embodiment, the second control frames from the client station STA1 and the client station STA2 overlap with each other and also mask the omission of the second control frame by the client station STA3. Since the AP 14 can decode the second control frame in each 20 MHz channel, the AP 14 knows that 20 MHz channel 908 can't be used.

In the embodiment shown in FIG. 13, the client station STA3 does not suitably receive or decode the corresponding A-MPDUs of the DL OFDMA data unit 1306 and thus does not provide a response to the A-MPDUs of the DL OFDMA data unit 1306, as shown by the unused OFDM sub-channels 906 during the UL OFDMA data unit 1308. In this embodiment, efficiency of the OFDM channel 909 is reduced due to failed transmission of data units to and from the client station STA3 during the OFDMA data unit 1306 and 1308, but the efficiency is improved with respect to the embodiment shown in FIG. 12. In some embodiments, when the number of polled client stations is less than a maximum number of OFDM sub-channels in a primary 20 MHz channel, the AP 14 polls the client stations through the primary 20 MHz channel.

Figure 14:
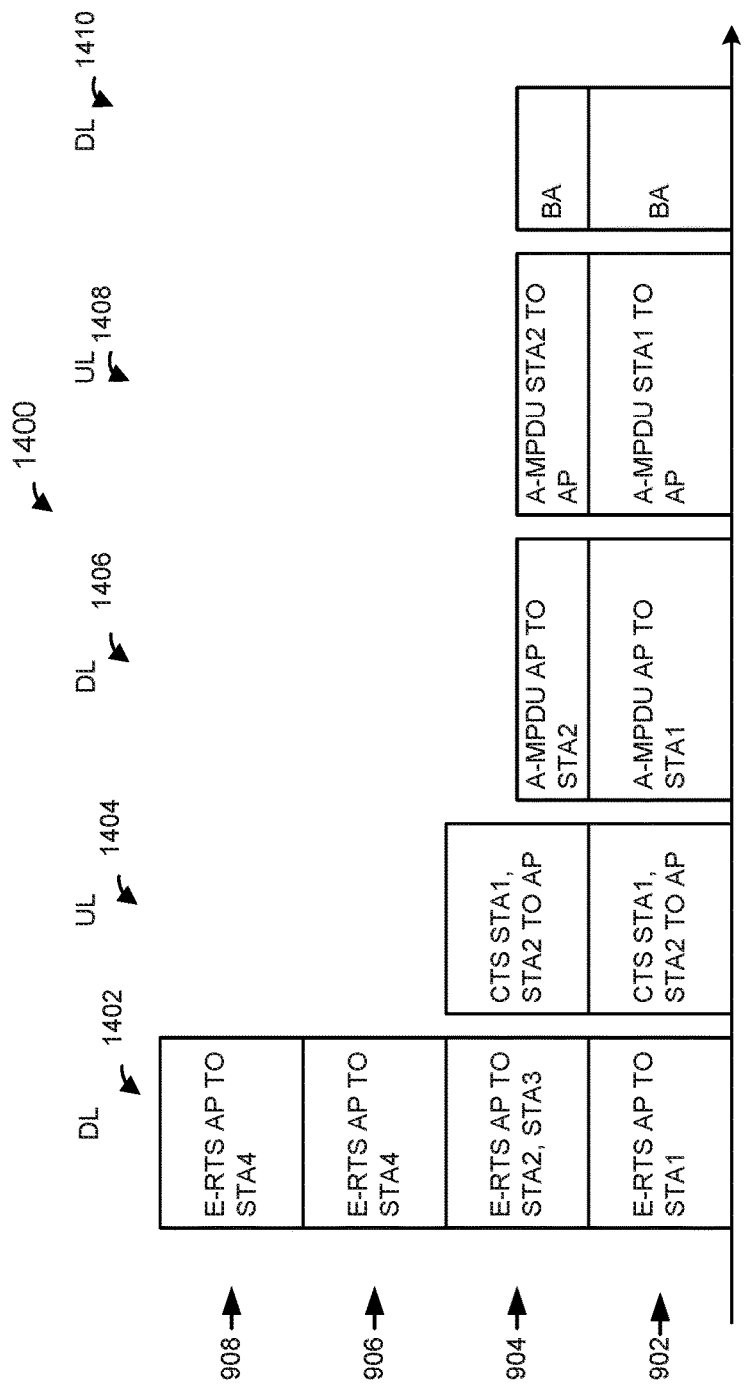
FIG. 14 is a diagram illustrating a frame exchange between an AP and a plurality of client stations, according to another embodiment.

FIG. 14 is a diagram illustrating a frame exchange 1400 between an AP (not shown) and a plurality of client stations (not shown), according to another embodiment. The frame exchange 1400 includes downlink (DL) duplicated legacy data unit 1402, DL OFDMA data unit 1406, and DL OFDMA data unit 1410, which are transmitted by the AP to multiple client stations STA1, STA2, STA3, and STA4, and also includes uplink (UL) duplicated legacy data unit 1404 and UL OFDMA data unit 1408, which are transmitted by the multiple client stations to the AP, in an embodiment. With reference to FIG. 1, in an embodiment, the AP 14 transmits the downlink data units 1402, 1406, and 1410 and different ones of the client stations 25 transmit at least a portion of the uplink data units 1404 and 1408. The data units 1402, 1404, 1406, 1408, and 1410 are transmitted via the 20 MHz OFDM sub-channels 902, 904, 906, and 908 of the OFDM channel 909 in a manner similar to the transmission of the OFDMA data units 910, 912, 914, 916, and 918, as described above with respect to FIG. 9A, in an embodiment.

In the embodiment of FIG. 14, the AP 14 utilizes duplicated legacy and OFDMA communication to communicate with the plurality of client stations STA1, STA2, STA3, and STA4. In an embodiment, respective sub-channels are allocated to the plurality of client stations for OFDMA communication with the plurality of the client stations. In an embodiment, the smallest channel of the WLAN 10 in which the AP 14 and the client stations STA1, STA2, STA3, and STA4 operate is 20 MHz, and channel allocation for OFDMA communication includes at least some channels narrower than 20 MHz. For example, respective 10 MHz sub-channels within the sub-channel 904 are allocated to each of the client stations STA2 and STA3, a 20 MHz sub-channel (sub-channel 902) is allocated to the client station STA1, and a 40 MHz sub-channel (sub-channels 906 and 908) is allocated to the client station STA4, in the illustrated embodiment.

In the embodiment shown in FIG. 14, the DL duplicated legacy data unit 1402 includes respective first control frames across each of the 20 MHz channels 902, 904, 906, and 908. In an embodiment, the first control frame of the DL OFDMA data unit 1402 is an enhanced RTS frame or other suitable frame that provides an indication requesting simultaneous control frame transmissions from the plurality of client stations for OFDMA communication. In other words, the first control frame indicates that the plurality of communication devices STA1, STA2, STA3, and STA4 are requested to simultaneously transmit respective control frames to the AP 14 as the duplicated legacy data unit 1404 in multiple 20 MHz channels and legacy data unit 1404 in 20 MHz channel. In the embodiment, the AP 14 can decode the control frame in each 20 MHz channel. In the embodiment shown of FIG. 14, the first control frame indicates the different allocated sub-channels of the OFDM channel 909 on which each of the plurality of client stations is to transmit their respective UL OFDMA data unit 1408. In the embodiment, each of the plurality of client stations uses 20 MHz channel(s) which cover the client station's sub-channel to transmit control frame of the UL duplicated legacy data unit 1404.

In response to the first control frame of the DL duplicated legacy data unit 1402, each of the client stations indicated by the DL duplicated legacy data unit 1402 determines whether at least the 20 MHz channel(s) that cover the station's sub-channel are available, in an embodiment. For example, each of the plurality of client stations performs a CSMA/CA procedure to determine whether the 20 MHz channel(s) that cover the station's sub-channel are available to the respective client station. In an embodiment, in response to determining that the 20 MHz channel(s) that cover the station's sub-channel are available to the client station, the client station provides the respective second control frames to the AP 14 via the 20 MHz channel(s) that cover the station's sub-channel.

With respect to the client stations STA2 and STA3 that share a 20 MHz bandwidth channel, each of the client stations STA2 and STA3 determines whether the corresponding 20 MHz channel(s) that cover their OFDM sub-channels is available. In response to a determination that the 20 MHz channel that covers the allocated. OFDM sub-channels is available, the client station transmits the second control frame across the 20 MHz channel. In the embodiment shown in FIG. 14, the client station STA2 determines that the allocated OFDM sub-channel is available and transmits the second control frame across the 20 MHz channel 904. In other words, the client station STA2 transmits the second control frame across a 20 MHz sub-channel that is larger than the 10 MHz sub-channel which was allocated to the client station STA2. In some embodiments and/or scenarios, both the client station STA2 and the client station STA3 transmit the second control frame across the 20 MHz sub-channel. In other words, the client station STA2 and the client station STA3 transmit respective second control frames via a same 20 MHz sub-channel of the OFDM channel 909.

The OFDMA data units 1406, 1408, and 1410 are generally similar to the OFDMA data units 1006, 1008, and 1010, except that only the client stations which provided the second control frame to the AP 14, client station STA1 and the client station STA2, receive and transmit the corresponding OFDM data units, in an embodiment. In some embodiments and/or scenarios, the efficiency of the OFDM channel 909 is reduced due to the unused bandwidth corresponding to the client stations STA3 and STA 4. For example, the client stations STA3 and STA4 cannot transmit when their allocated OFDM sub-channels are unavailable, the client stations STA2 and STA3 cannot transmit during the OFDM sub-channels allocated to other devices (e.g., the OFDM sub-channels 906 and 908 allocated to client stations STA3 and STA4, respectively), and the client station STA4 cannot transmit during the 10 MHz sub-channel allocated to the client station STA3.

Figure 15A:
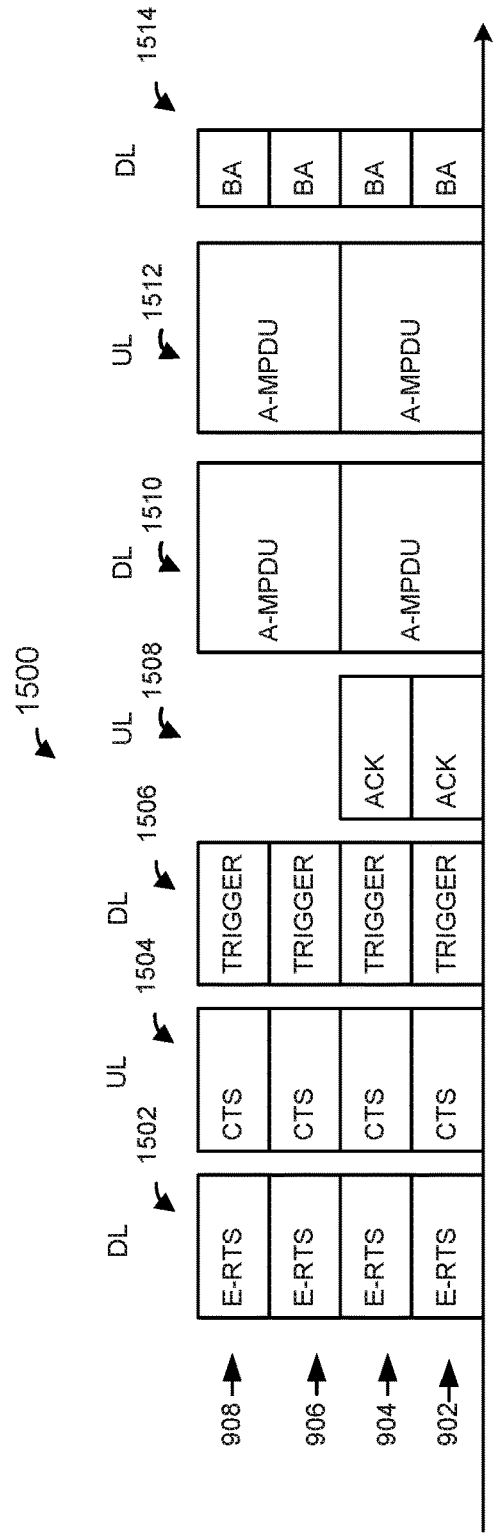
FIG. 15A is a diagram illustrating a frame exchange between an AP and a plurality of client stations, according to another embodiment.

FIG. 15A is a diagram illustrating a frame exchange 1500 between an AP (not shown) and a plurality of client stations (not shown), according to another embodiment. The frame exchange 1500 includes downlink (DL) duplicated legacy data unit 1502, DL OFDMA data unit 1506, DL OFDMA data unit 1510, and DL OFDMA data unit 1514, which are transmitted by the AP to multiple client stations STA1, STA2, STA3, and STA4, and also includes uplink (UL) duplicated legacy data unit 1504, UL OFDMA data unit 1508, and UL OFDMA data unit 1512, which are transmitted by the multiple client stations to the AP, in an embodiment. With reference to FIG. 1, in an embodiment, the AP 14 transmits the downlink data units 1502, 1506, 1510, and 1514 and different ones of the client stations 25 transmit at least a portion of the uplink data units 1504, 1508, and 1512. The data units 1502, 1504, 1506, 1508, 1510, 1512, and 1514 are transmitted via the sub-channels 902, 904, 906, and 908 of the OFDM channel 909 in a manner similar to the transmission of the data units 910, 912, 914, 916, and 918, as described above with respect to FIG. 9A, in an embodiment.

The duplicated legacy data units 1502 and 1504 are similar to the duplicated legacy data units 1002 and 1004, respectively, in an embodiment. For example, the duplicated legacy data units 1502 and 1504 provide a simultaneous CTS exchange between the AP 14 and the client stations STA1, STA2, STA3, and STA4. In the embodiment shown in FIG. 15A, the AP 14 polls the client stations STA1, STA2, STA3, and STA4 using the duplicated legacy data unit 1502 and receives respective second control frames, duplicated across the OFDM channel 909, from the client station STA1 and client station STA2.

In some embodiments described above, the second control frames from the client station STA1 and the client station STA2 overlap with each other and also mask the omission of the second control frames by the client station STA3 and the client station STA4. In the embodiment shown in FIG. 15A, the AP 14 performs an available station polling using DL duplicated legacy data unit 1506 and UL OFDMA data unit 1508 to determine the available 20 MHz or other suitable bandwidth OFDM sub-channels for a subsequent OFDMA data transmission. In this embodiment, the simultaneous CTS exchange 1504 provides suitable TXOP protection from transmissions by other client stations and the available station/channel polling 1508 determines the available station and a more efficient OFDM sub-channel allocation for those client stations that have responded to the AP 14.

In the embodiment shown in FIG. 15A, the AP 14 transmits a control frame, for example, a scheduling frame, trigger frame, or SYNC frame, within the duplicated legacy data unit 1506 that indicates a request for an indication of available OFDM sub-channels from the client stations STA1, STA2, STA3, and STA4, in an embodiment. In response to the control frame of the OFDMA data unit 1506, the client stations STA1, STA2, STA3, and STA4 i) determine whether at least some of the 20 MHz OFDM sub-channels 902, 904, 906, and 908 are available to the respective client station, and ii) transmit an indication of the OFDM sub-channels available to the respective client station to the AP 14 via the OFDMA data unit 1508. In an embodiment, the OFDMA data unit 1508 includes respective data units from the client stations that have at least one available OFDM sub-channel. In an embodiment, each of the client stations that has an available OFDM sub-channel transmits a respective control frame, inline frame, or other suitable frame that includes the indication of the available OFDM sub-channels to the AP 14. In response to the UL OFDMA data unit 1508 with the respective indications of the available OFDM sub-channels, the AP 14 and client stations exchange the OFDMA data unit 1510, 1512, and 1514, in a manner similar to that described above for OFDMA data units 1006, 1008, and 1001, except using an allocation of the OFDM sub-channels that is based on the indication of the available OFDM sub-channels. In the embodiment shown in FIG. 15A, the client stations STA1 and STA2 respond to the control frame of the OFDMA data unit 1506 by providing respective acknowledgment frames within the OFDMA data unit 1508. In one embodiment, the available indication is included in the HE A-Control field.

Figure 15B:
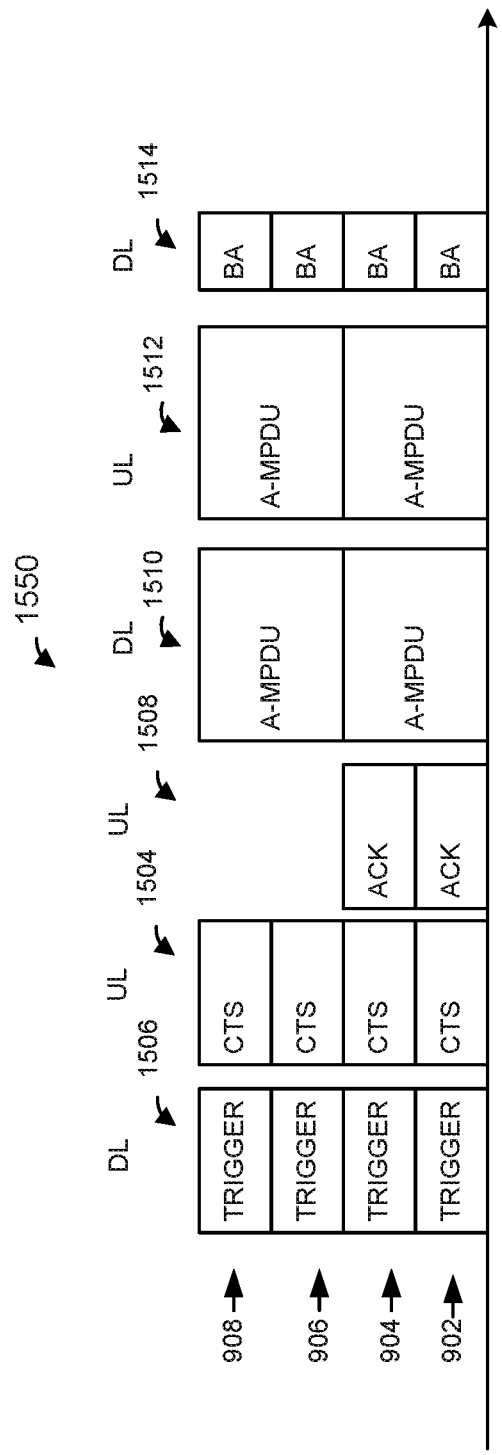
FIG. 15B is a diagram illustrating a frame exchange between an AP and a plurality of client stations, according to another embodiment.

FIG. 15B is a diagram illustrating a frame exchange 1550 between an AP (not shown) and a plurality of client stations (not shown), according to another embodiment. The frame exchange 1550 includes downlink (DL) legacy duplicated data unit 1506, DL OFDMA data unit 1510, and DL OFDMA data unit 1514, which are transmitted by the AP to multiple client stations STA1, STA2, STA3, and STA4, and also includes uplink (UL) OFDMA data unit 1504, UL OFDMA data unit 1508, and UL OFDMA data unit 1512, which are transmitted by the multiple client stations to the AP, in an embodiment. With reference to FIG. 1, in an embodiment, the AP 14 transmits the downlink data units 1506, 1510, and 1514 and different ones of the client stations 25 transmit at least a portion of the uplink data units 1504, 1508, and 1512. The data units 1506, 1504, 1508, 1510, 1512, 1514 are transmitted via the OFDM sub-channel s 902, 904, 906, and 908 of the OFDM channel 909 in a manner similar to the transmission of the data units 910, 912, 914, 916, and 918, as described above with respect to FIG. 9A, in an embodiment.

The frame exchange 1550 is similar to the frame exchange 1500, except that the AP 14 initiates the simultaneous CTS exchange between the AP 14 and the client stations STA1, STA2, STA3, and STA4 by transmitting the duplicated legacy data unit 1506. In this embodiment, the control frames of the data unit 1506 include an indication of the client stations that are requested to respond and also an indication of the OFDM sub-channels on which the client stations are to respond. In response to the OFDMA data unit 1506, the client stations transmit both the duplicated legacy data unit 1504 and the OFDMA data unit 1508 to the AP 14. In this way, the simultaneous CTS exchange and the bandwidth negotiation are performed more efficiently, for example, with fewer frames.

Figure 16:
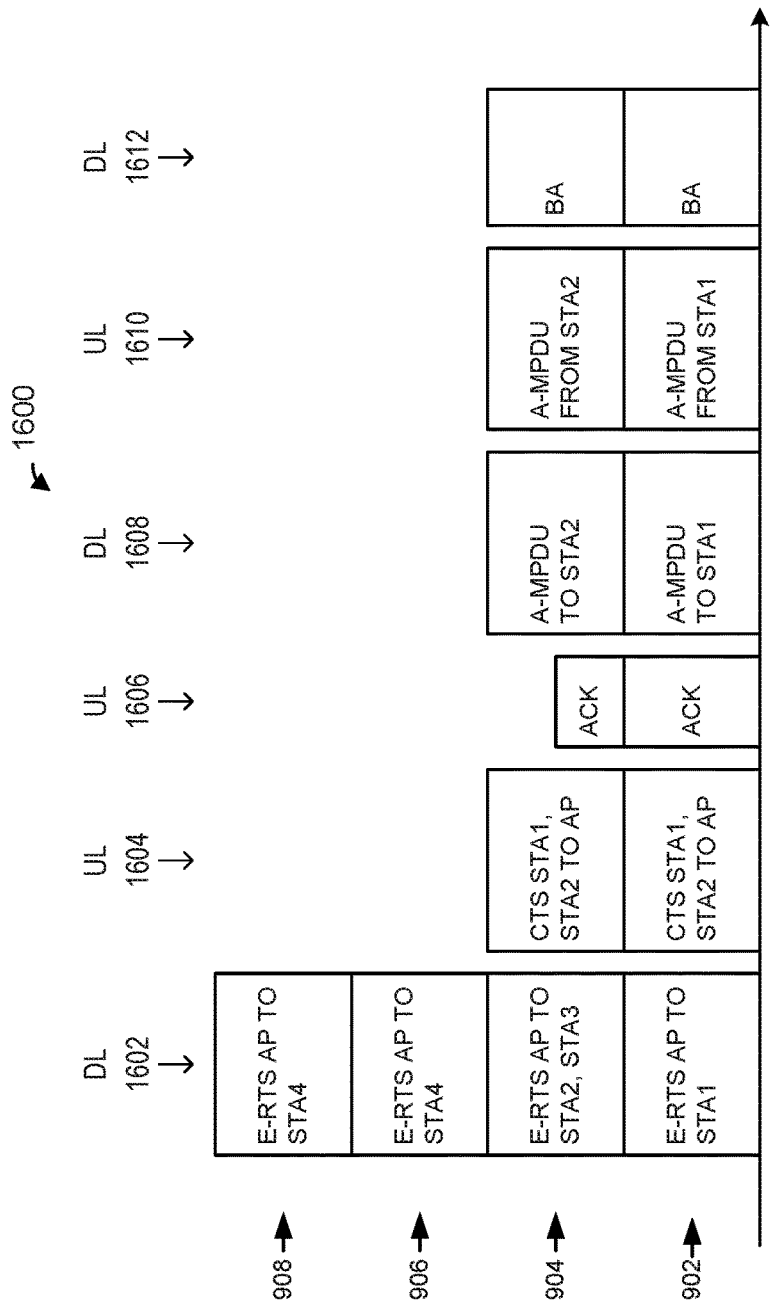
FIG. 16 is a diagram illustrating a frame exchange between an AP and a plurality of client stations, according to another embodiment.

FIG. 16 is a diagram illustrating a frame exchange 1600 between an AP (not shown) and a plurality of client stations (not shown), according to another embodiment. The frame exchange 1600 includes downlink (DL) duplicated legacy data unit 1602, DL OFDMA data unit 1608, and DL OFDMA data unit 1612, which are transmitted by the AP to multiple client stations STA1, STA2, STA3, and STA4, and also includes uplink (UL) duplicated legacy data unit 1604, UL OFDMA data unit 1606, and UL OFDMA data unit 1610, which are transmitted by the multiple client stations to the AP, in an embodiment. With reference to FIG. 1, in an embodiment, the AP 14 transmits the downlink data units 1602, 1608, and 1612 and different ones of the client stations 25 transmit at least a portion of the uplink data units 1604, 1606, and 1610. The data units 1602, 1604, 1606, 1608, 1610, and 1612 are transmitted via the OFDM sub-channels 902, 904, 906, and 908 of the OFDM channel 909 in a manner similar to the transmission of the data units 910, 912, 914, 916, and 918, as described above with respect to FIG. 9A, in an embodiment.

The frame exchange 1600 is similar to the frame exchange 1400, except that the AP 14 performs a polling of the client stations in a manner similar to that described with respect to FIG. 159, in an embodiment. In the embodiment of FIG. 16, the AP 14 utilizes duplicated legacy and OFDMA communication to communicate with the plurality of client stations STA1, STA2, STA3, and STA4. In an embodiment, respective sub-channels are allocated to the plurality of client stations for OFDMA communication with the plurality of the client stations. In an embodiment, the smallest channel of the WLAN 10 in which the AP 14 and the client stations STA1, STA2, STA3, and STA4 operate is 20 MHz, and channel allocation for OFDMA communication includes at least some channels narrower than 20 MHz. For example, respective 10 MHz sub-channels within the sub-channel 904 are allocated to each of the client stations STA2 and STA3, a 20 MHz sub-channel (sub-channel 902) is allocated to the client station STA1, and a 40 MHz sub-channel (sub-channels 906 and 908) is allocated to the client station STA4, in the illustrated embodiment.

In the embodiment shown in FIG. 16, the DL duplicated legacy data unit 1602 includes respective first control frames across each of the 20 MHz OFDM sub-channels 902, 904, 906, and 908. In an embodiment, the first control frame of the DL duplicated legacy data unit 1602 is an enhanced RTS frame that provides an indication requesting simultaneous control frame transmissions from the plurality of client stations and indicates the different allocated sub-channels of the OFDM channel 909 on which each of the plurality of client stations is to transmit their respective control frame of the UL OFDMA data unit 1604.

In an embodiment, in response to the duplicated legacy data unit 1602, the client stations transmit the duplicated legacy data unit 1604 and the OFDMA data unit 1606 to the AP 14, which are similar to the data units 1504 and 1508, respectively. In this way, the simultaneous CTS exchange and the bandwidth negotiation are performed more efficiently, for example, with fewer frames. In the embodiment shown in FIG. 16, the client station STA2 provides a control frame that indicates that the entire OFDM sub-channel 904 is available to it. The OFDMA data units 1608, 1610, and 1612 are generally similar to the OFDMA data units 1006, 1008, and 1010, except that the AP 14 performs the OFDMA data exchange using the entire OFDM sub-channel 904 for the client station STA2, instead of only an initial 10 MHz sub-channel allocation.

Figure 17:
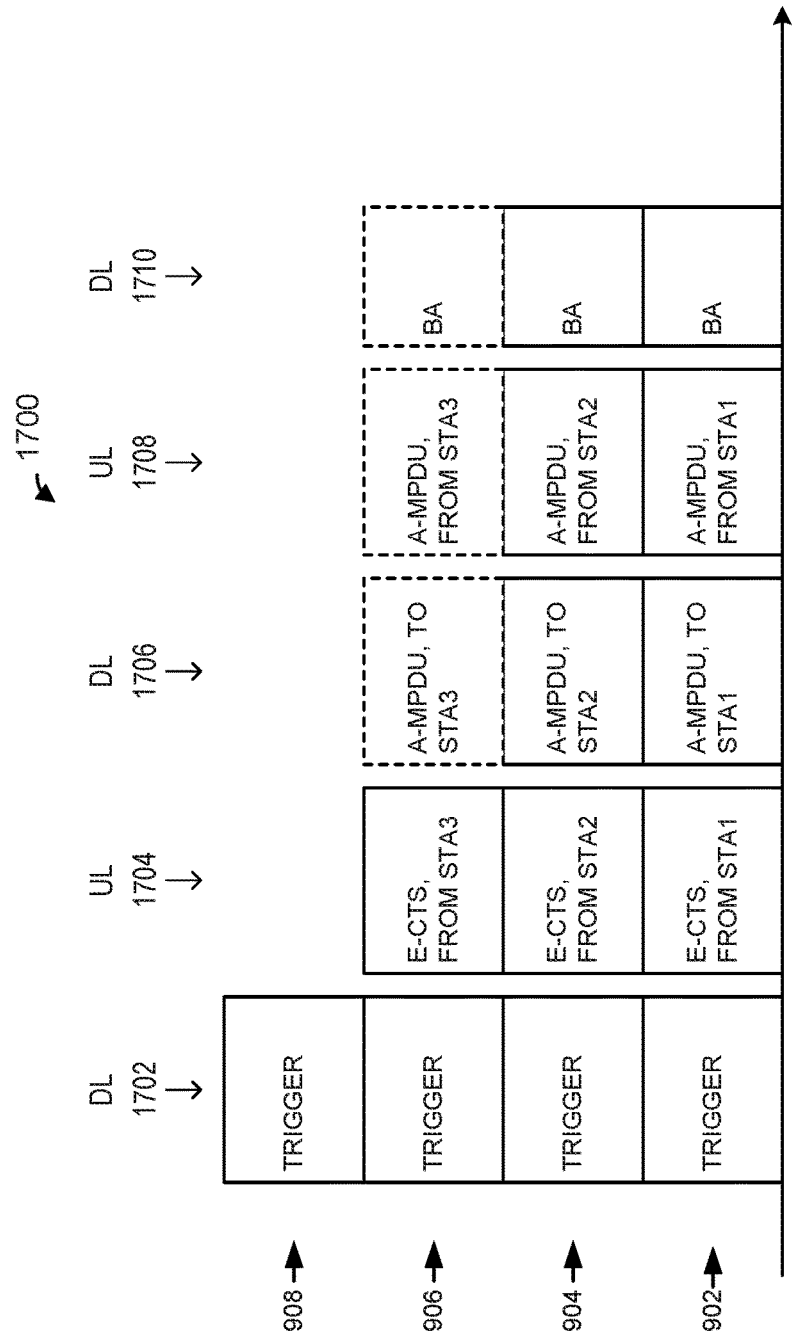
FIG. 17 is a diagram illustrating a frame exchange between an AP and a plurality of client stations, according to another embodiment.

FIG. 17 is a diagram illustrating a frame exchange 1700 between an AP (not shown) and a plurality of client stations (not shown), according to another embodiment. The frame exchange 1700 includes downlink (DL) data units 1702, 1706, and 1710, which are transmitted by the AP to multiple client stations STA1, STA2, STA3, and STA4, and also includes uplink (UL) data units 1704 and 1708, which are transmitted by the multiple client stations to the AP, in an embodiment. With reference to FIG. 1, in an embodiment, the AP 14 transmits the downlink data units 1702, 1706, and 1710 and different ones of the client stations 25 transmit at least a portion of the uplink data units 1704 and 1708. The data units 1702, 1704, 1706, 1708, and 1710 are transmitted via the OFDM sub-channels 902, 904, 906, and 908 of the OFDM channel 909 in a manner similar to the transmission of the data units 910, 912, 914, 916, and 918, as described above with respect to FIG. 9A, in an embodiment.

In the embodiment of FIG. 17, the AP 14 transmits a control frame, for example, a scheduling frame, trigger frame, or SYNC frame, within the duplicated legacy data unit 1702 that indicates a request for an indication of available OFDM sub-channels from the client stations STA1, STA2, STA3, and STA4, in an embodiment. In this embodiment, the duplicated legacy data unit 1702 also indicates an allocated. OFDM sub-channel for each of the client stations. In response to the control frame of the OFDMA data unit 1702, the client stations STA1, STA2, STA3, and STA4 i) determine whether the indicated allocated OFDM sub-channels are available to the respective client station, and ii) transmit an indication of the availability to the AP 14 via the OFDMA data unit 1704 using the allocated OFDM sub-channel. In this embodiment, the OFDM sub-channel allocated for a client station to provide the second control frame is a same OFDM sub-channel that is used for a subsequent OFDMA data transmission. In an embodiment, the OFDMA data unit 1704 includes enhanced RTS frames. Although in this embodiment, a legacy client station in the vicinity of the client stations cannot readily set its NAV correctly, TXOP protection is provided by using the same OFDM sub-channel for the polling (e.g., OFDMA data unit 1702) and the data transmission during OFDMA data units 1706, 1708, and 1710.

Although the frame exchange 1700 utilizes a contiguous allocation of the OFDM sub-channels 902, 904, and 906, in another embodiment, a similar frame exchange utilizes a non-contiguous allocation of OFDM sub-channels, for example, the OFDM sub-channels 902, 904, and 908 for the client stations STA1, STA2, and STA4, respectively.

Figure 18:
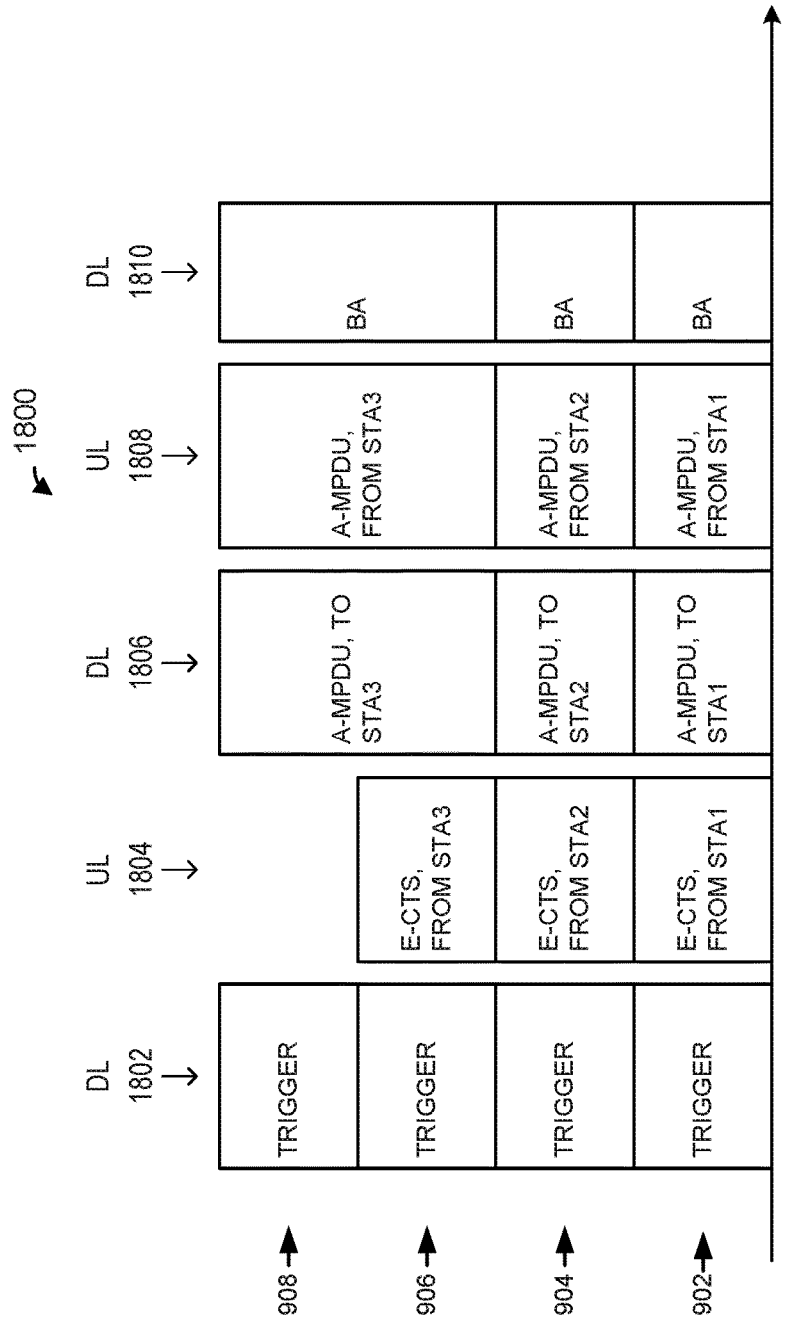
FIG. 18 is a diagram illustrating a frame exchange between an AP and a plurality of client stations, according to another embodiment.

FIG. 18 is a diagram illustrating a frame exchange 1800 between an AP (not shown) and a plurality of client stations (not shown), according to another embodiment. The frame exchange 1800 includes downlink (DL) duplicated data unit 1802, DL OFDMA data unit 1806, and DL OFDMA data unit 1810, which are transmitted by the AP to multiple client stations STA1, STA2, STA3, and STA4, and also includes uplink (UL) OFDMA data units 1804 and 1808, which are transmitted by the multiple client stations to the AP, in an embodiment. In one embodiment, the data unit 1804 is an UL duplicated legacy data unit. With reference to FIG. 1, in an embodiment, the AP 14 transmits the downlink data units 1802, 1806, and 1810 and different ones of the client stations 25 transmit at least a portion of the uplink data units 1804 and 1808. The data units 1802, 1804, 1806, 1808, and 1810 are transmitted via the OFDM sub-channels 902, 904, 906, and 908 of the OFDM channel 909 in a manner similar to the transmission of the data units 910, 912, 914, 916, and 918, as described above with respect to FIG. 9A, in an embodiment.

The frame exchange 1800 is similar to the frame exchange 1700, except that the available OFDM sub-channels reported by at least one client station are wider than the allocated OFDM sub-channel for the client station. In the embodiment shown in FIG. 18, the client station STA3 provides an indication, in an E-CTS frame or other suitable control frame of the UL OFDMA data unit 1804, that the OFDM sub-channels 906 and 908 are available to it for a subsequent OFDMA data transmission. In response to the indication, the AP 14 allocates the OFDM sub-channels 906 and 908 to the client station STA3 for the data exchange of OFDMA data units 1806, 1808, and 1810. In one embodiment, the available channels are reported through the HE A-Control field. In one embodiment, the AP 14 allocates multiple sub-channels which are narrower than 20 MHz and in different 20 MHz channels to a station. In the same embodiment, each STA use one of its allocated sub-channel to transmit the second control frame.

Although the frame exchange 1800 utilizes a contiguous allocation of the OFDM sub-channels 902, 904, and 906, in another embodiment, a similar frame exchange (not shown) utilizes a non-contiguous allocation of OFDM sub-channels, for example, the OFDM sub-channels 902, 904, and 908 for the client stations STA1, STA2, and STA4, respectively.

In an embodiment, the client stations transmit duplicated legacy CTS frames (not shown) after the E-CTS frames of the OFDMA data unit 1804 across the allocated OFDM sub-channels indicated by the trigger frame. The legacy CTS frames allow a legacy client station in the vicinity of the client stations to appropriately set their NAV, thus protecting the OFDMA data exchange. In an embodiment, the client stations transmit duplicated legacy CTS frames (not shown) that are wider than the initial allocation indicated by the trigger frame. In an embodiment, the AP 14 transmits an E-RTS frame or other suitable control frame to the client stations to indicate the OFDM channels on which the duplicated legacy CTS frames are to be transmitted.

Figure 19:
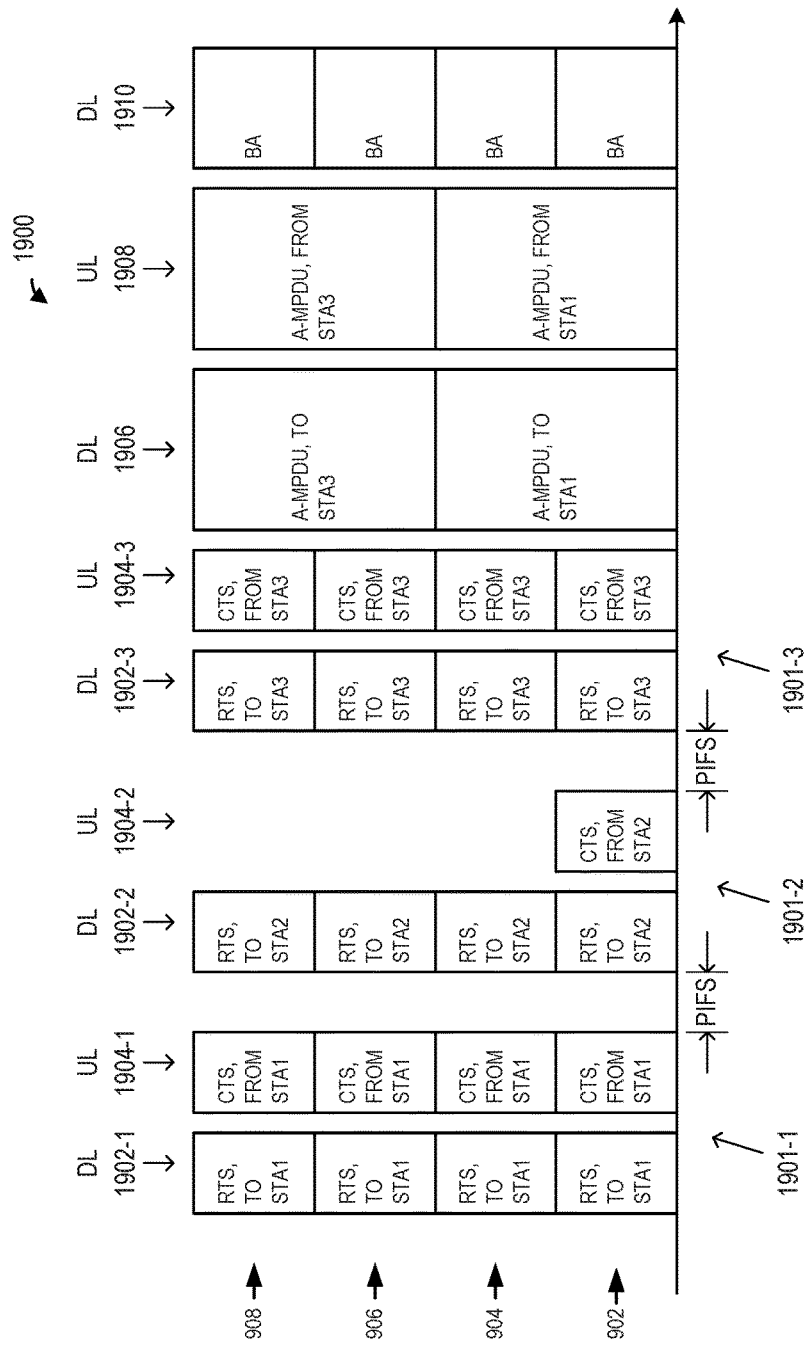
FIG. 19 is a diagram illustrating a frame exchange between an AP and a plurality of client stations, according to another embodiment.

FIG. 19 is a diagram illustrating a frame exchange 1900 between an AP (not shown) and a plurality of client stations (not shown), according to another embodiment. The frame exchange 1900 includes downlink (DL) duplicated legacy data unit 1902, DL OFDMA data unit 1906, 1910, which are transmitted by the AP to multiple client stations STA1, STA2, STA3, and STA4, and also includes uplink (UL) duplicated legacy data unit 1904, and OFDMA data unit 1908, which are transmitted by the multiple client stations to the AP, in an embodiment. With reference to FIG. 1, in an embodiment, the AP 14 transmits the downlink data units 1902, 1906, and 1910 and different ones of the client stations 25 transmit at least a portion of the uplink data units 1904, 1908. The data units 1902, 1904, 1906, 1908, 1910 are transmitted via the OFDM sub-channels 902, 904, 906, and 908 of the OFDM channel 909 in a manner similar to the transmission of the data units 910, 912, 914, 916, and 918, as described above with respect to FIG. 9A, in an embodiment.

In the frame exchange 1900, the AP 14 performs a cascading, dynamic bandwidth negotiation 1901 with the client stations, in various embodiments and/or scenarios. In an embodiment, the negotiations 1901 provide that an available bandwidth reported by one client station will not influence the bandwidth of a subsequent negotiation. In the embodiment shown in FIG. 19, the AP 14 transmits, for multiple client station with a respective negotiation 1901, an RTS frame 1902 that is duplicated across the entire OFDM channel 909. In response to the RTS frame 1902, the corresponding client station transmits a CTS frame 1904 that is duplicated across the 20 MHz OFDM sub-channels of the OFDM channel 909 that are available to the client station. In the embodiment shown in FIG. 19, the client stations STAT and STA3 indicate that each of the 20 MHz OFDM sub-channels 902, 904, 906, and 908 are available, while the client station STA2 indicates that only the OFDM sub-channel 902 is available. The negotiations 1901 are separated by a point control function (PCF) interframe space (PIFS) duration, or other suitable duration, in various embodiments. The AP 14 allocates the OFDM sub-channels based on the negotiations 1901, in an embodiment. In the embodiment shown in FIG. 19, the AP allocates the OFDM sub-channels 902 and 904 to the client station STA1 and allocates the OFDM sub-channels 906 and 908 to the client station STA3. In other embodiments, the AP selects a subset of the client stations for the OFDMA data exchange and uses a minimal bandwidth reported by the selected client stations for the OFDMA data exchange, e.g. the AP allocates sub-channel 902 for STA2, and allocates sub-channels other than 902 to STA1 and STA3.

In an embodiment, the AP 14 transmits a control frame, for example, an RTS frame, to trigger a duplicate CTS from the client stations prior to the OFDMA data exchange. In an embodiment, the duplicate CTS protects the OFDMA data exchange, particularly when neighbors of the client stations support a dynamic extended interframe space (EIFS) duration.

Figure 20:
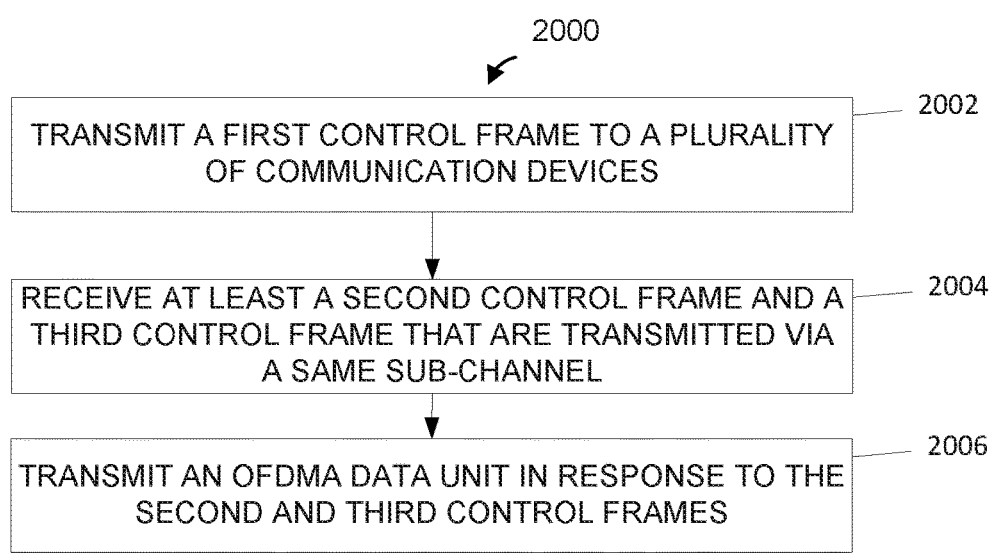
FIG. 20 is a flow diagram of an example method for simultaneous communication in a wireless local area network, according to an embodiment.

FIG. 20 is a flow diagram illustrating an example method 2000 for transmitting a resource request for an OFDMA transmission, according to an embodiment. In an embodiment, the method 2000 is implemented by a client station in the WLAN, according to an embodiment. With reference to FIG. 1, the method 2000 is implemented by the network interface 27, in an embodiment. For example, in one such embodiment, the PHY processor 29 is configured to implement the method 2000. According to another embodiment, the MAC processing 28 is also configured to implement at least a part of the method 2000. With continued reference to FIG. 1, in yet another embodiment, the method 2000 is implemented by the network interface 16 (e.g., the PHY processor 20 and/or the MAC processor 18). In other embodiments, the method 2000 is implemented by other suitable network interfaces.

At block 2002, a first communication device transmits a first control frame to a plurality of communication devices, in an embodiment. In an embodiment, for example, the AP 14 transmits the OFDMA data unit 1002, 1202, 1302, 1402, 1502, 1506, 1602, 1702, 1802, or 1902 to the client stations 25, as described above. The first control frame: i) is duplicated by the first communication device across each of a plurality of 20 MHz sub-channels of an orthogonal frequency division multiplexing (OFDM) channel, and ii) indicates that the plurality of communication devices are requested to simultaneously transmit respective control frames to the first communication device.

At block 2004, the first communication device receives at least some of the respective control frames from at least some of the plurality of communication devices that include at least a second control frame from a second communication device of the plurality of communication devices, and a third control frame from a third communication device of the plurality of communication devices, in an embodiment. In an embodiment, for example, the AP 14 receives the CTS frame of the OFDMA data unit 1004, 1204, 1304, 1404, 1504, 1604, 1704, 1804, or 1904 from the client stations 25, as described above. The second control frame and the third control frame are transmitted by the second communication device and the third communication device, respectively, to the first communication device via a same sub-channel of the plurality of sub-channels having a smallest bandwidth of the wireless local area network, in an embodiment. The at least some of the respective control frames indicate that at least some of the plurality of sub-channels are available, in an embodiment. In an embodiment, the first control frame and second control frame are transmitted multiple times. In this embodiment, at least one second control frame is transmitted through duplicated legacy data unit for TXOP protection, and at least one other second control frame is transmitted through OFDMA data unit for available sub-channel polling.

At block 2006, the first communication device transmits an orthogonal frequency division multiple access (OFDMA) data unit in response to the at least some of the respective control frames via the at least some of the plurality of sub-channels that are available, in an embodiment. In an embodiment, for example, the AP 14 transmits the OFDMA data unit 1006, 1206, 1306, 1406, 1510, 1608, 1706, 1806, or 1906 to the client stations 25, as described above.

Figure 21:
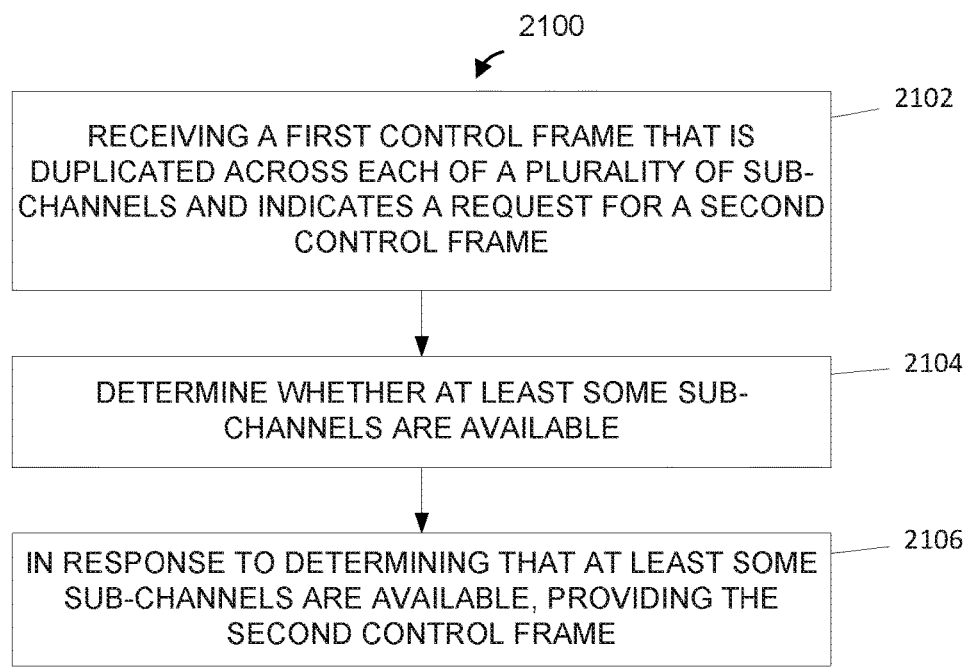
FIG. 21 is a flow diagram of an example method for simultaneous communication in a wireless local area network, according to an embodiment.

FIG. 21 is a flow diagram illustrating an example method for allocating radio resources for an OFDMA transmission, according to another embodiment. In an embodiment, the method 2100 is implemented by a client station in the WLAN, according to an embodiment. With reference to FIG. 1, the method 2100 is implemented by the network interface 27, in an embodiment. For example, in one such embodiment, the PHY processor 29 is configured to implement the method 2100. According to another embodiment, the MAC processing 28 is also configured to implement at least a part of the method 2100. With continued reference to FIG. 1, in yet another embodiment, the method 2100 is implemented by the network interface 16 (e.g., the PHY processor 20 and/or the MAC processor 18). In other embodiments, the method 2100 is implemented by other suitable network interfaces.

At block 2102, a first control frame is received by a first communication device from a second communication device, in an embodiment. The first control frame: i) is duplicated across each of a plurality of sub-channels of an orthogonal frequency division multiplexing (OFDM) channel, and ii) indicates a request for the first communication device to transmit a second control frame to the second communication device. In an embodiment, for example, the client station 25 receives the OFDMA data unit 1002, 1202, 1302, 1402, 1502, 1506, 1602, 1702, 1802, or 1902 from the AP 14, as described above.

At block 2104, the first communication device determines whether at least some of the sub-channels of the plurality of sub-channels are available, in an embodiment. In an embodiment, for example, the client station determines whether at least some of the OFDM sub-channels 902, 904, 906, or 908 are available, as described above.

At block 2106, in response to determining that at least some of the plurality of sub-channels are available, the first communication device provides the second control frame to the second communication device, in an embodiment. In an embodiment, for example, the client station 25 transmits the CTS frame of the OFDMA data unit 1004, 1204, 1304, 1404, 1504, 1604, 1704, 1804, or 1904 to the AP 14, as described above. The second control frame is duplicated across the at least some of the plurality of sub-channels that are available. Providing the second control frame includes generating the second control frame to indicate that the at least some of the plurality of sub-channels are available, identifying a scramble seed for the second control frame that allows the first communication device to decode i) the second control frame, and ii) a third control frame to be transmitted by a third communication device, wherein the second control frame is to be transmitted simultaneously with the third control frame, and scrambling the second control frame with the identified scramble seed. In an embodiment, the primary rate based on the first control frame's transmission rate is used to transmit the second control frame. In another embodiment, a data rate indicated in the frame body of the first control frame is used to transmit the second control frame. In one embodiment, the second control frame is used to report the available channel and transmitted in UL OFDMA data unit. In another embodiment, the second control frame is used to protect the TXOP and transmitted in UL duplicated legacy data unit.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for simultaneous communication in a wireless local area network, the method comprising:
    allocating, by a first communication device, respective frequency allocations for a plurality of other communication devices, including a second communication device and a third communication device, for one or more subsequent transmissions to or by the plurality of other communication devices, the respective frequency allocations including i) a first frequency allocation corresponding to the second communication device, the first frequency allocation corresponding to a first frequency portion of a first sub-channel among a plurality of sub-channels of an orthogonal frequency division multiplexing (OFDM) channel, and ii) a second frequency allocation corresponding to the third communication device, the second frequency allocation corresponding to a second frequency portion of the first sub-channel, the second frequency portion different than the first frequency portion;

transmitting, by the first communication device, a request-to-send (RTS) frame to the plurality of other communication devices, wherein the RTS frame: i) is duplicated by the first communication device across each of the plurality of sub-channels, ii) indicates that the plurality of other communication devices are requested to simultaneously transmit respective clear-to-send (CTS) frames to the first communication device;

receiving, at the first communication device, at least some of the respective CTS frames from at least some of the plurality of other communication devices, wherein the respective CTS frames include at least:
  a first CTS frame from the second communication device, the first CTS frame spanning the first sub-channel that encompasses the first frequency portion and the second frequency portion, and
  a second CTS frame from the third communication device, the second CTS frame spanning the first sub-channel that encompasses the first frequency portion and the second frequency portion, wherein the second CTS frame is received simultaneously with reception of the first CTS frame, and wherein the at least some of the respective CTS frames indicate that at least some of the plurality of sub-channels are available; and transmitting, by the first communication device, an orthogonal frequency division multiple access (OFDMA) data unit in response to the at least some of the respective CTS frames, the OFDMA data unit including first data for the second communication device in the first frequency portion and second data for the third communication device in the second frequency portion.

2. The method of claim 1, wherein:
the RTS frame is an enhanced request to send (E-RTS) frame that indicates the respective sub-channel allocation of the plurality of sub-channels for each of the plurality of communication devices.

3. The method of claim 1, wherein:
the respective CTS frames are used to report available sub-channels;
the method further comprises receiving an uplink OFDMA data unit that includes:
  first data transmitted by the second communication device in the first frequency portion of the first sub-channel, and
  second data transmitted by the third communication device in the second frequency portion of the first sub-channel.

4. The method of claim 1, wherein:
the first CTS frame and the second CTS frame include respective HE A-Control fields;
the OFDMA data unit is a first downlink OFDMA data unit transmitted on at least some of the plurality of sub-channels that are available; and the method further comprises:
  receiving, by the first communication device, an uplink OFDMA transmission that includes at least one acknowledgment that i) is transmitted in response to the first downlink OFDMA data unit by a particular communication device of the at least some of the plurality of other communication devices, and ii) indicates available sub-channels of the plurality of sub-channels that are available to the particular communication device; and
  transmitting, by the first communication device, a second downlink OFDMA data unit that includes third data for the particular communication device in at least some of the available sub-channels.

5. The method of claim 4, wherein the respective HE A-Control fields include available sub-channel information.

6. The method of claim 1, wherein:
each of the at least some of the respective CTS frames is duplicated by a particular communication device of the at least some of the plurality of other communication devices across idle sub-channels of the plurality of sub-channels of the OFDM channel.

7. The method of claim 1, wherein:
each of the at least some of the respective CTS frames is scrambled using a same scramble seed; and
the method further comprises decoding each of the at least some of the respective CTS frames using the same scramble seed.

8. The method of claim 7, wherein the method further comprises scrambling the RTS frame using the same scramble seed.

9. The method of claim 1, wherein receiving the at least some of the respective CTS frames comprises receiving the at least some of the respective CTS frames at a same data rate.

10. The method of claim 9, wherein the same data rate is a primary data rate determined based on the data rate of the RTS frame.

11. The method of claim 9, wherein the same data rate is a data rate which is defined in the frame body of the RTS frame.

12. A first communication device for simultaneous communication in a wireless local area network, the first communication device comprising:
a network interface device having one or more integrated circuits configured to:
  allocate respective frequency allocations for a plurality of other communication devices, including a second communication device and a third communication device, for one or more subsequent transmissions to or by the plurality of other communication devices, the respective frequency allocations including i) a first frequency allocation corresponding to the second communication device, the first frequency allocation corresponding to a first frequency portion of a first sub-channel among a plurality of sub-channels of an orthogonal frequency division multiplexing (OFDM) channel, and ii) a second frequency allocation corresponding to the third communication device, the second frequency allocation corresponding to a second frequency portion of the first sub-channel, the second frequency portion different than the first frequency portion,
  transmit a request-to-send (RTS) frame to the plurality of other communication devices, wherein the RTS frame: i) is duplicated by the first communication device across each of the plurality of sub-channels, ii) indicates that the plurality of other communication devices are requested to simultaneously transmit respective clear-to-send (CTS) frames to the first communication device, receive at least some of the respective CTS frames from at least some of the plurality of other communication devices, wherein the respective CTS frames include at least:

a first CTS frame from the second communication device, the first CTS frame spanning the first sub-channel that encompasses the first frequency portion and the second frequency portion, and a second CTS frame from the third communication device, the second CTS frame spanning the first sub-channel that encompasses the first frequency portion and the second frequency portion, wherein the second CTS frame is received simultaneously with reception of the first CTS frame, and wherein the at least some of the respective CTS frames indicate that at least some of the plurality of sub-channels are available;

wherein the one or more integrated circuits are further configured to:

generate a transmission signal corresponding to an orthogonal frequency division multiple access (OFDMA) data unit in response to the at least some of the respective CTS frames, the OFDMA data unit including first data for the second communication device in the first frequency portion and second data for the third communication device in the second frequency portion.

13. The first communication device of claim 12, wherein: the RTS frame is an enhanced request to send (E-RTS) frame that indicates the respective sub-channel allocation of the plurality of sub-channels for each of the plurality of communication devices.

14. The first communication device of claim 12, wherein: the respective CTS frames are used to report available sub-channels;

the one or more integrated circuits are configured to receive an uplink OFDMA data unit that includes:

first data transmitted by the second communication device in the first frequency portion of the first sub-channel, and second data transmitted by the third communication device in the second frequency portion of the first sub-channel.

15. The first communication device of claim 12, wherein: the first CTS frame and the second CTS frame include respective HE A-Control fields;

the OFDMA data unit is a first downlink OFDMA data unit transmitted on at least some of the plurality of sub-channels that are available; and the one or more integrated circuits are configured to:

receive an uplink OFDMA transmission that includes at least one acknowledgment that i) is transmitted in response to the first downlink OFDMA data unit by a particular communication device of the at least some of the plurality of other communication devices, and ii) indicates available sub-channels of the plurality of sub-channels that are available to the particular communication device, and generate a transmission signal corresponding to a second downlink OFDMA data unit that includes third data for the particular communication device in at least some of the available sub-channels.

16. The first communication device of claim 15, wherein the respective HE A-Control fields include available sub-channel information.

17. The first communication device of claim 12, wherein: each of the at least some of the respective CTS frames is duplicated by a particular communication device of the at least some of the plurality of other communication devices across idle sub-channels of the plurality of sub-channels of the OFDM channel.

18. The first communication device of claim 12, wherein: each of the at least some of the respective CTS frames is scrambled using a same scramble seed; and the one or more integrated circuits are configured to decode each of the at least some of the respective CTS frames using the same scramble seed.

19. A method for simultaneous communication in a wireless local area network, the method comprising:

receiving, by a first communication device and from a second communication device, a request to send (RTS) frame, wherein the RTS frame: i) is duplicated across each of a plurality of sub-channels of an orthogonal frequency division multiplexing (OFDM) channel, and ii) indicates a request for the first communication device to transmit a first clear to send (CTS) frame to the second communication device;

determining, by the first communication device, whether at least a sub-channel, of the plurality of sub-channels, is available, wherein a first frequency portion of the sub-channel is allocated to the first communication device;

in response to determining that the sub-channel of the plurality of sub-channels is available, providing the first CTS frame to the second communication device, the first CTS frame spanning the sub-channel;

wherein providing the first CTS frame comprises:

generating the first CTS frame to indicate that the at least some of the plurality of sub-channels are available, identifying a scramble seed for the first CTS frame that allows the second communication device to decode i) the first CTS frame, and ii) a second CTS frame to be transmitted by a third communication device that is allocated a second frequency portion of the sub-channel, the second frequency portion being different than the first frequency portion, the second CTS frame spanning the sub-channel that encompasses the first frequency portion and the second frequency portion, wherein the first CTS frame is to be transmitted simultaneously with the second CTS frame, and scrambling the first CTS frame with the identified scramble seed.

20. The method of claim 19, wherein:

the method further comprises receiving, by the first communication device, downlink data in an orthogonal frequency division multiple access (OFDMA) data unit in response to the first CTS frame via at least the sub-channel that is available; and the method further comprises transmitting uplink data to the second communication device in response to the downlink data via the at least the sub-channel that is available.

21. The method of claim 19, wherein identifying the scramble seed for the first CTS frame comprises identifying a scramble seed of the RTS frame as the scramble seed for the first CTS frame.

22. A first communication device for simultaneous communication in a wireless local area network, the first communication device comprising:
  a network interface device having one or more integrated circuits configured to:
    receive, from a second communication device, a request to send (RTS) frame, wherein the RTS frame: i) is duplicated across each of a plurality of sub-channels of an orthogonal frequency division multiplexing (OFDM) channel, and ii) indicates a request for the first communication device to transmit a first clear to send (CTS) frame to the second communication device,
    determine whether at least a sub-channel, of the plurality of sub-channels, is available, wherein a first frequency portion of the sub-channel is allocated to the first communication device,
    in response to determining that the sub-channel of the plurality of sub-channels is available, providing the first CTS frame to the second communication device, the first CTS frame spanning the sub-channel,
    generate the first CTS frame to indicate that the at least some of the plurality of sub-channels are available,
    identify a scramble seed for the first CTS frame that allows the second communication device to decode i) the first CTS frame, and ii) a second CTS frame to be transmitted by a third communication device that is allocated a second frequency portion of the sub-channel, the second frequency portion being different than the first frequency portion, the second CTS frame spanning the sub-channel encompassing the first frequency portion and the second frequency portion, wherein the first CTS frame is to be transmitted simultaneously with the second CTS frame, and
    scramble the first CTS frame with the identified scramble seed.

23. The first communication device of claim 22, wherein:
  the one or more integrated circuits are configured to receive downlink data in an orthogonal frequency division multiple access (OFDMA) data unit in response to the first CTS frame via at least the sub-channel that is available; and
  the one or more integrated circuits are configured to transmit uplink data to the second communication device in response to the downlink data via the at least the sub-channel that is available.

24. The first communication device of claim 22, wherein the one or more integrated circuits are configured to identify a scramble seed of the RTS frame as the scramble seed for the first CTS frame.

* * * * *